(12) United States Patent
Mackenzie et al.

(10) Patent No.: US 12,105,819 B2
(45) Date of Patent: Oct. 1, 2024

(54) DISTRIBUTED LEDGER PLATFORM FOR ACCESS CONTROL

(71) Applicant: Koch Capabilities, LLC, Wichita, KS (US)

(72) Inventors: Stephen Mackenzie, Wichita, KS (US); Tim Davies, Wichita, KS (US)

(73) Assignee: KOCH CAPABILITES, LLC., Wichita, KS (US)

( * ) Notice: Subject to any disclaimer, the term of this patent is extended or adjusted under 35 U.S.C. 154(b) by 627 days.

(21) Appl. No.: 17/250,584

(22) PCT Filed: Aug. 6, 2019

(86) PCT No.: PCT/IB2019/056687
§ 371 (c)(1),
(2) Date: Feb. 5, 2021

(87) PCT Pub. No.: WO2020/031086
PCT Pub. Date: Feb. 13, 2020

(65) Prior Publication Data
US 2021/0294913 A1    Sep. 23, 2021

Related U.S. Application Data

(60) Provisional application No. 62/715,610, filed on Aug. 7, 2018.

(51) Int. Cl.
*H04L 29/06* (2006.01)
*G06F 16/182* (2019.01)
*G06F 21/62* (2013.01)

(52) U.S. Cl.
CPC ........ *G06F 21/6218* (2013.01); *G06F 16/182* (2019.01)

(58) Field of Classification Search
CPC .......................... G06F 21/6218; G06F 16/182
See application file for complete search history.

(56) References Cited

U.S. PATENT DOCUMENTS 9,317,824 B2    4/2016  Cloutier
2012/0324220 A1 * 12/2012  Norton ................ G06F 21/6245
                                                                          713/165

(Continued)

FOREIGN PATENT DOCUMENTS

WO    WO-2017136956 A1 *  8/2017  ............. G06F 16/27
WO    WO-2018/019364 A1    2/2018

(Continued)

OTHER PUBLICATIONS

International Search Report and Written Opinion for International Application No. PCT/IB2019/056687, Nov. 4, 2019, (11 pages), European Patent Office, Rijswijk, Netherlands.

(Continued)

*Primary Examiner* — Shawnchoy Rahman
(74) *Attorney, Agent, or Firm* — Alston & Bird LLP

(57) ABSTRACT

Methods, systems, apparatus, and computer program products related to a distributed ledger platform/system for managing large capital projects are provided. In an example embodiment, the distributed ledger platform/system includes a plurality of nodes, wherein each node is in data communication with the other nodes; a ledger stored in each node; and a transaction verification to verify the at least one transaction information/data. The ledger contains transaction information related to at least one of the following: vendor payments, intellectual property licensing, construction certifications, equipment inspections, vendor qualification, vendor selection criteria, document access, and regulatory compliance.

21 Claims, 9 Drawing Sheets

(56) References Cited

U.S. PATENT DOCUMENTS

| | | | |
|---|---|---|---|
| 2014/0268244 A1* | 9/2014 | Sheridan | G06Q 10/10 |
| | | | 358/403 |
| 2015/0095501 A1* | 4/2015 | Candelore | H04L 61/5038 |
| | | | 709/227 |
| 2017/0220815 A1* | 8/2017 | Ansari | G06Q 20/36 |
| 2017/0249303 A1 | 8/2017 | Wencel | |
| 2018/0270065 A1* | 9/2018 | Brown | H04L 9/0861 |
| 2019/0147174 A1* | 5/2019 | Narasimhan | G06Q 10/0838 |
| | | | 726/29 |
| 2019/0180329 A1* | 6/2019 | Chetlur | G06Q 50/01 |
| 2019/0278852 A1* | 9/2019 | Jayachandran | H04L 9/0643 |

FOREIGN PATENT DOCUMENTS

| | | | | |
|---|---|---|---|---|
| WO | WO-2018/069566 A1 | | 4/2018 | |
| WO | WO-2018217788 A1 | * | 11/2018 | G01J 3/443 |
| WO | WO-2020123361 A1 | * | 6/2020 | G06F 16/256 |

OTHER PUBLICATIONS

Zyskind, Guy et al. *Decentralizing Privacy: Using Blockchain To Protect Personal Data*, In 2015 IEEE Security and Privacy Workshops, May 21, 2015, pp. 180-184, IEEE. DOI: 10.1109/SPW.2015.27.

* cited by examiner

DISTRIBUTED LEDGER PLATFORM FOR ACCESS CONTROL

CROSS REFERENCE TO RELATED APPLICATIONS

This application is a National Stage Application, filed under 35 U.S.C. § 371, of International Application No. PCT/IB2019/056687, filed Aug. 6, 2019, which claims priority to U.S. Application No. 62/715,610, filed Aug. 7, 2018; the contents of both of which are hereby incorporated by reference in their entirety.

FIELD

Various embodiments relate generally to distributed ledgers and interactive user interfaces for providing information/data for recording in the distributed ledger and for accessing information/data stored in the distributed ledger. For example, an example embodiment relates to a distributed ledger platform/system for storing and providing information/data corresponding to one or more projects. An example embodiment relates to the use of distributed ledger (blockchain, for example) technology to improve the management of large capital projects, including construction projects and intellectual property (IP) licensing projects.

BACKGROUND

Large capital projects, including IP licensing and construction projects, involve the management of tens of thousands of engineering and vendor documents and other information/data. Access to these documents and other information/data must be restricted to approved parties. As revisions and corrections occur it is important to ensure the appropriate parties have access to the same current information/data. Failure to do so results in errors and costly rework. Further, large capital projects also require the management of numerous payments to vendors, inspectors and other contractors. As the project progresses and construction and equipment delivery take place, performance against specifications is confirmed and payments are made in accordance with contract terms. In addition, multiple regulatory and other tasks must be completed—these often involve the sharing of documents and other information/data. For example, information/data about participants in the project such as contact information, bank account data and evidence of regulatory certifications must be made available to relevant parties. Further, IP licensing projects require the disclosure of sensitive information/data to various vendors, with little or no-way to track if the information/data is being used outside the scope of the license.

BRIEF SUMMARY OF SOME EXAMPLE EMBODIMENTS

The current fragmented approach to these tasks results in significant cost, duplicated efforts, errors, and potential loss of intellectual property. Therefore, there is a need in the industry to provide a system that can manage the dissemination of large volumes of documents and information/data to various third parties, collect information/data on project progress, facilitate payments, and protect the disclosure and misuse of intellectual property. This must be done in a manner that is secure and allows parties to rely on the correctness of the documents and information/data they are using.

By providing an appropriately permissioned single version of the truth, a shared distributed ledger platform/system that is available to the major project participants will help improve effectiveness and efficiency by reducing costs and errors, improving visibility and auditability, and providing a better way to control and monitor access to trade secrets and other confidential information/data. In addition, using self-executing ("smart") contracts, oracles and other tools, a shared platform will enable automation of currently manually intensive processes such as facilitating confirmations that work has been completed in line with requirements and approvals of payments in line with agreed contractual terms.

Various embodiments provide methods, apparatuses, computer program products, systems, and/or the like for providing a distributed ledger platform/system for use in managing one or more projects. In various embodiments, a project may be the construction of a facility; operation of a facility; maintaining a facility; and/or the like. In various embodiments, a facility is a physical asset (e.g., a building, factory, refinery, campus, portion of a campus, and/or the like). In various embodiments, the project may directly or indirectly require access to one or more IP elements (e.g., patented technology, trade secret technology, engineering drawings, piping and instrumentation diagrams (P&IDs), and/or the like). For example, the design and/or construction of the facility may include the use of one or more IP elements. In another example, the facility may be configured to use one or more IP elements to perform one or more of the facilities functions (e.g., the facility may use a patented or trade secret machine or a patented or trade secret method to manufacture an item). Thus, one or more vendors hired to perform one or more tasks or projects of the project may come in contact with portions of various IP elements when performing the one or more tasks or projects. In various embodiments, the distributed ledger platform/system is configured to determine if a particular vendor has the appropriate credentials to perform a particular task or sub-project and/or to receive IP element related information/data required for performing the particular task or sub-project. In various embodiments, the distributed ledger platform/system is configured to control access to documents related to the one or more projects such that vendors are only provided with access to documents and/or portions of documents required for performing the particular task or sub-project. In various embodiments, the distributed ledger platform/system is configured to trigger payments for various benchmarks, tasks, and/or sub-projects. In various embodiments, the distributed ledger platform/system is configured to track maintenance, repairs, safety inspections, and/or the like of the facility.

In accordance with one aspect, a distributed ledger platform/system is provided. In an example embodiment, the distributed ledger platform/system includes a plurality of nodes, wherein each node is in data communication with the other nodes; a ledger stored in each node; and a transaction verification to verify the at least one transaction information/data. The ledger contains transaction information/data related to at least one of the following: vendor payments, intellectual property licensing, construction certifications, equipment inspections, vendor qualification, vendor selection criteria, document access, and regulatory compliance.

In accordance with another aspect, a method for managing large capital projects is provided. In an example embodiment, the method comprises providing at least one vendor access to a distributed ledger; checking the vendor's credentials against a stored variable; permitting the vendor to access specific information/data contained in the distributed ledger when the vendor credential matches/satisfies the stored variable; and not permitting the vendor to access the specific information/data contained in the distributed ledger when the vendor credential does not match/satisfy the stored variable. The specific information/data is related to at least one of the following: vendor payments, intellectual property licensing, construction certifications, equipment inspections, vendor qualification, vendor selection criteria, document access, and regulatory compliance.

In accordance with still another aspect, a computer program product is provided. In an example embodiment, the computer program product comprises a non-transitory computer readable medium having computer program instructions stored therein. The computer program instructions, when executed by a processor, cause the processor to provide at least one vendor access to a distributed ledger; check the vendor's credentials against a stored variable; permit the vendor to access specific information/data contained in the distributed ledger when the vendor credential matches/satisfies the stored variable; and not permit the vendor to access the specific information/data contained in the distributed ledger when the vendor credential does not match/satisfy the stored variable. The specific information/data is related to at least one of the following: vendor payments, intellectual property licensing, construction certifications, equipment inspections, vendor qualification, vendor selection criteria, document access, and regulatory compliance.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
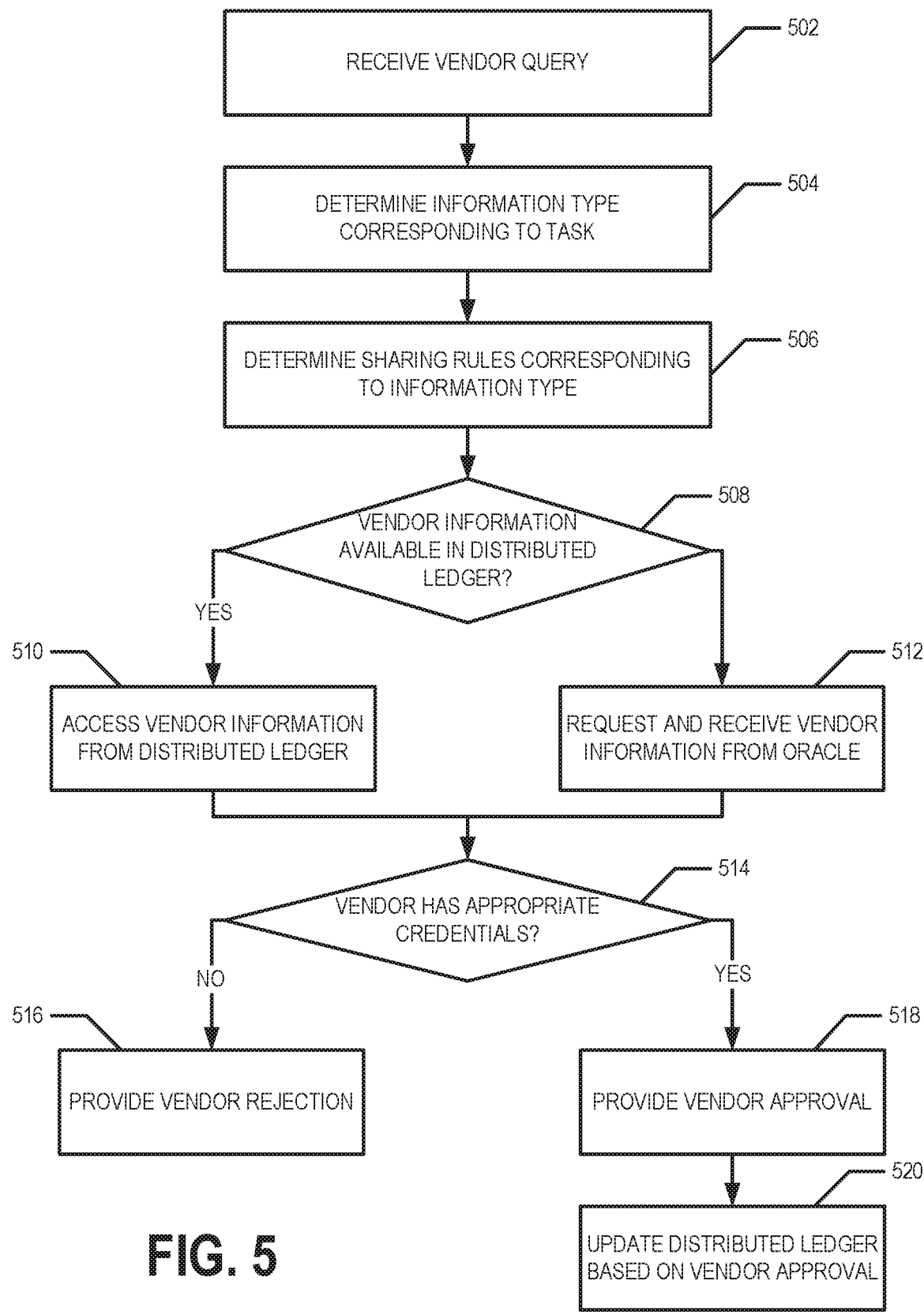
Figure 6:
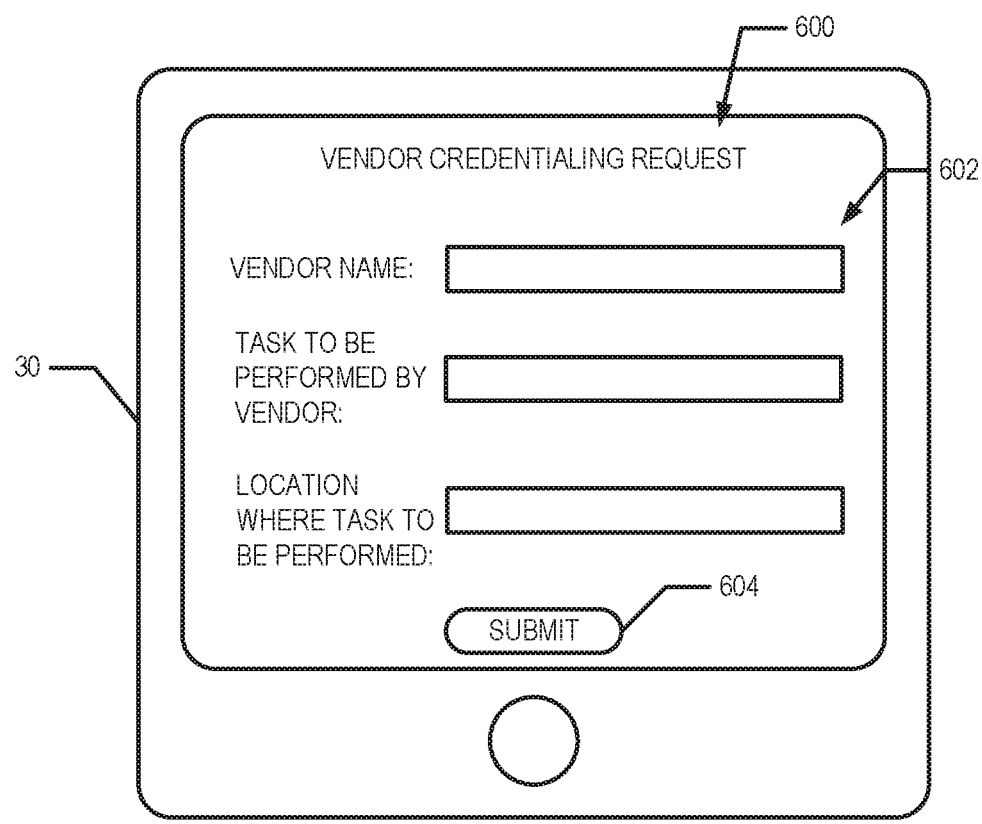
Figure 7:
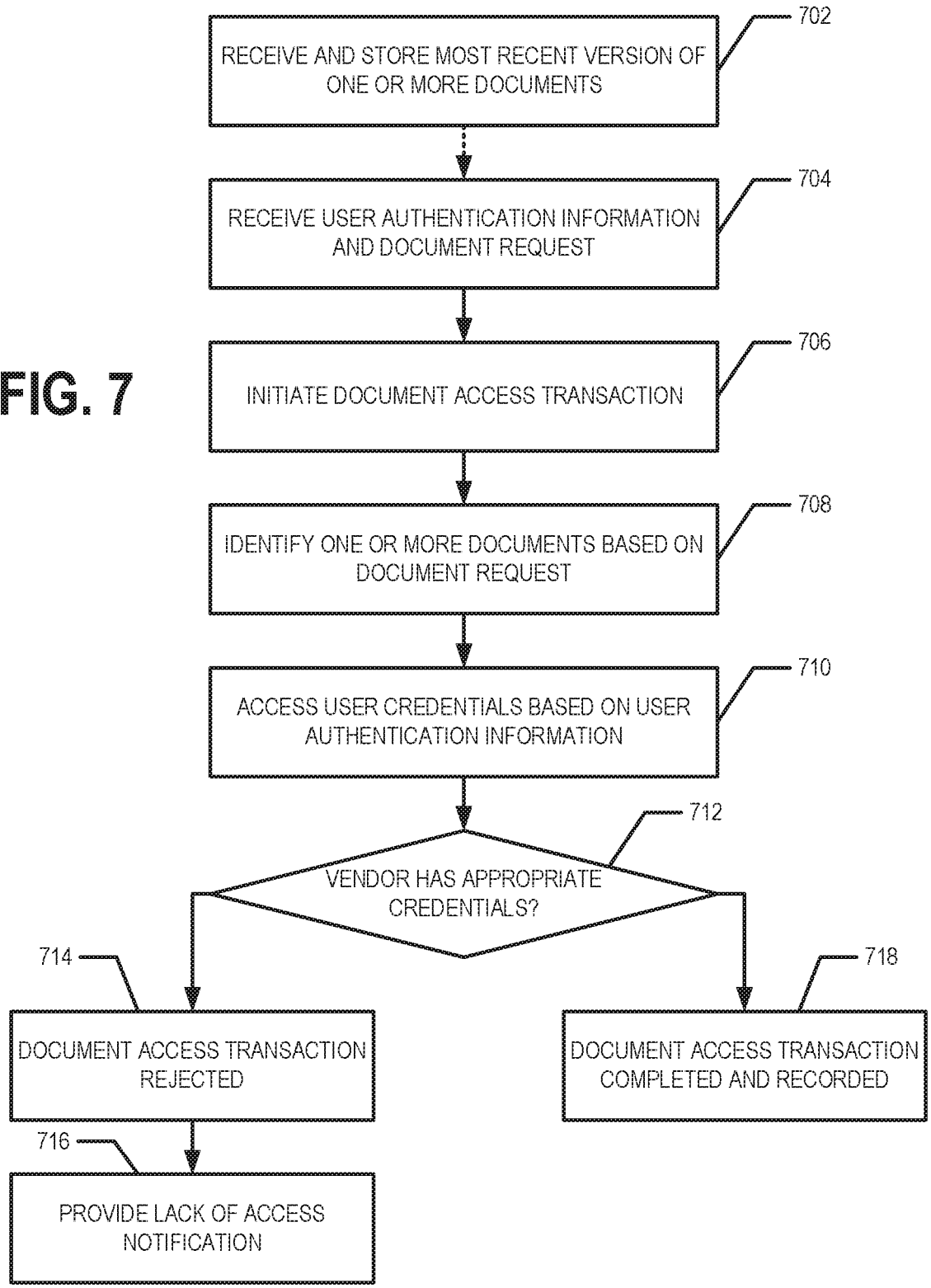
Figure 8:
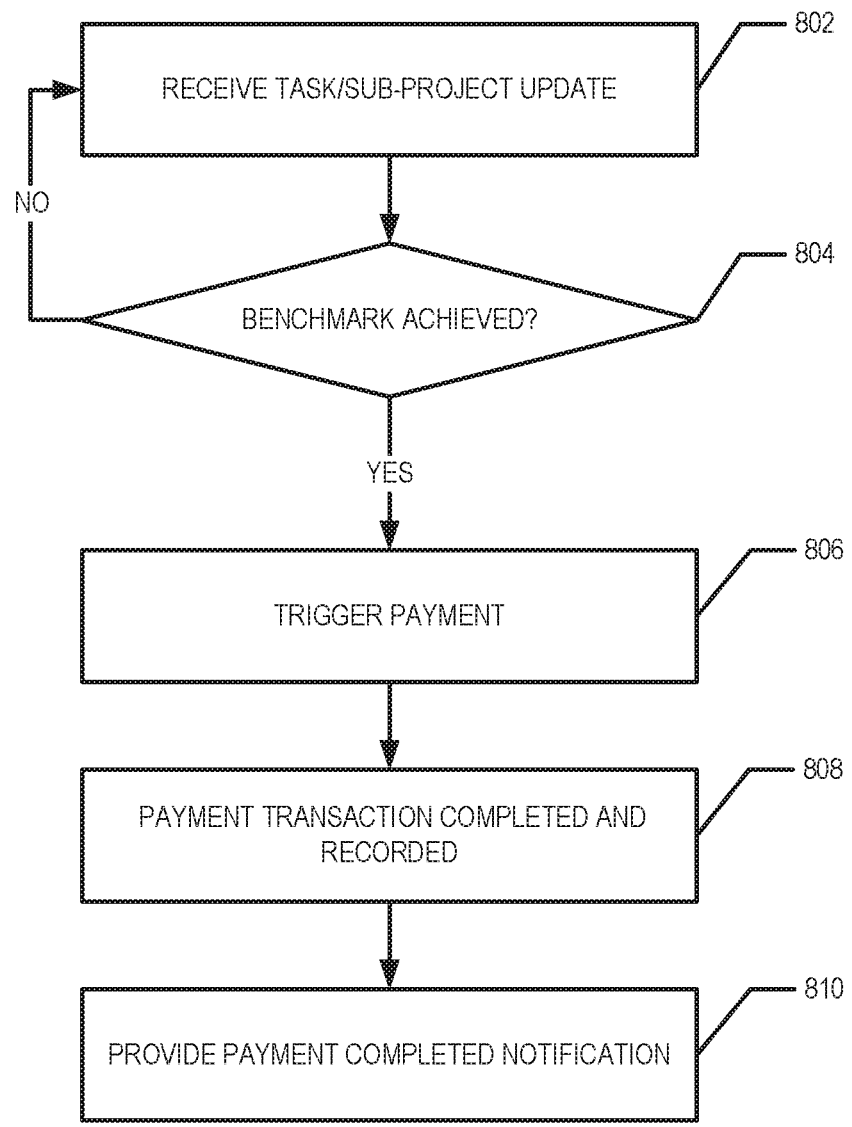

FIG. 5 provides a flowchart illustrating processes, steps, procedures, operations, and/or the like for approving a vendor, in accordance with an example embodiment of the present invention;

FIG. 6 provides an example interface of a vendor approval request view of an interactive user interface (IUI) of the distributed ledger platform/system, in accordance with an example embodiment of the present invention;

FIG. 7 provides a flowchart illustrating processes, steps, procedures, operations, and/or the like for providing vendor appropriate documents and/or portions thereof, in accordance with an example embodiment of the present invention; and FIG. 8 provides a flowchart illustrating processes, steps, procedures, operations, and/or the like for triggering payment of completion of a benchmark by the distributed ledger platform/system, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. BRIEF OVERVIEW

Various embodiments provide a distributed ledger platform/system 100, also referred to as "the platform/system" herein. In various embodiments, the platform/system 100 is configured for capturing, storing, and providing access to information/data corresponding to a project. In an example embodiment, a project is the construction of a facility. In an example embodiment, a project is the operation of a facility. The platform/system 100 is configured for capturing and storing information/data related to a project corresponding to a facility. In various embodiments, the platform/system 100 is configured to control access to documents, portions of documents, and/or information/data corresponding to a project such that a vendor or other entity has the information/data required to perform a task or sub-project corresponding to the vendor or other entity but does not have access to information/data not required to perform the task or sub-project. In various embodiments, the platform/system 100 is configured to trigger and/or control payment of vendors and/or entities for completing tasks or projects and/or reaching particular benchmarks thereof via, for example, the use of smart contracts. In various embodiments, the platform/system 100 may use one or more oracles to vendor or other entity credentialing information/data. In an example embodiment, the platform/system 100 may control access to one or more documents and/or portions thereof stored in a data warehouse (e.g., outside of the distributed ledger). In an example embodiment, the platform/system 100 is configured to maintain maintenance, repair, inspection, and/or the like records corresponding to the facility.

In various embodiments, the platform/system 100 comprises one or more distributed ledgers, one or more oracles, one or more data warehouses, a user client/IUI, and/or the like. In various embodiments, a distributed ledger is a data store that is stored by a plurality of nodes that may be geographically separated. In various embodiments, each node of a distributed ledger may comprise one or more node computing entities. The copies of the distributed ledger are stored by the plurality of nodes of the distributed ledger. To ensure the validity of instances of information/data stored in the distributed ledger, to ensure transactions and/or value exchanges are properly and appropriately carried out, and/or to ensure that events (e.g., instances of information/data, transactions and/or value exchanges, and/or the like) written to the distributed ledger are in the appropriate format, a consensus and/or voting process may be used.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for instance, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules/engines, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module/engine (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module/engine (RIMM), dual in-line memory module/engine (DIMM), single in-line memory module/engine (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to step/operation diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For instance, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1A:
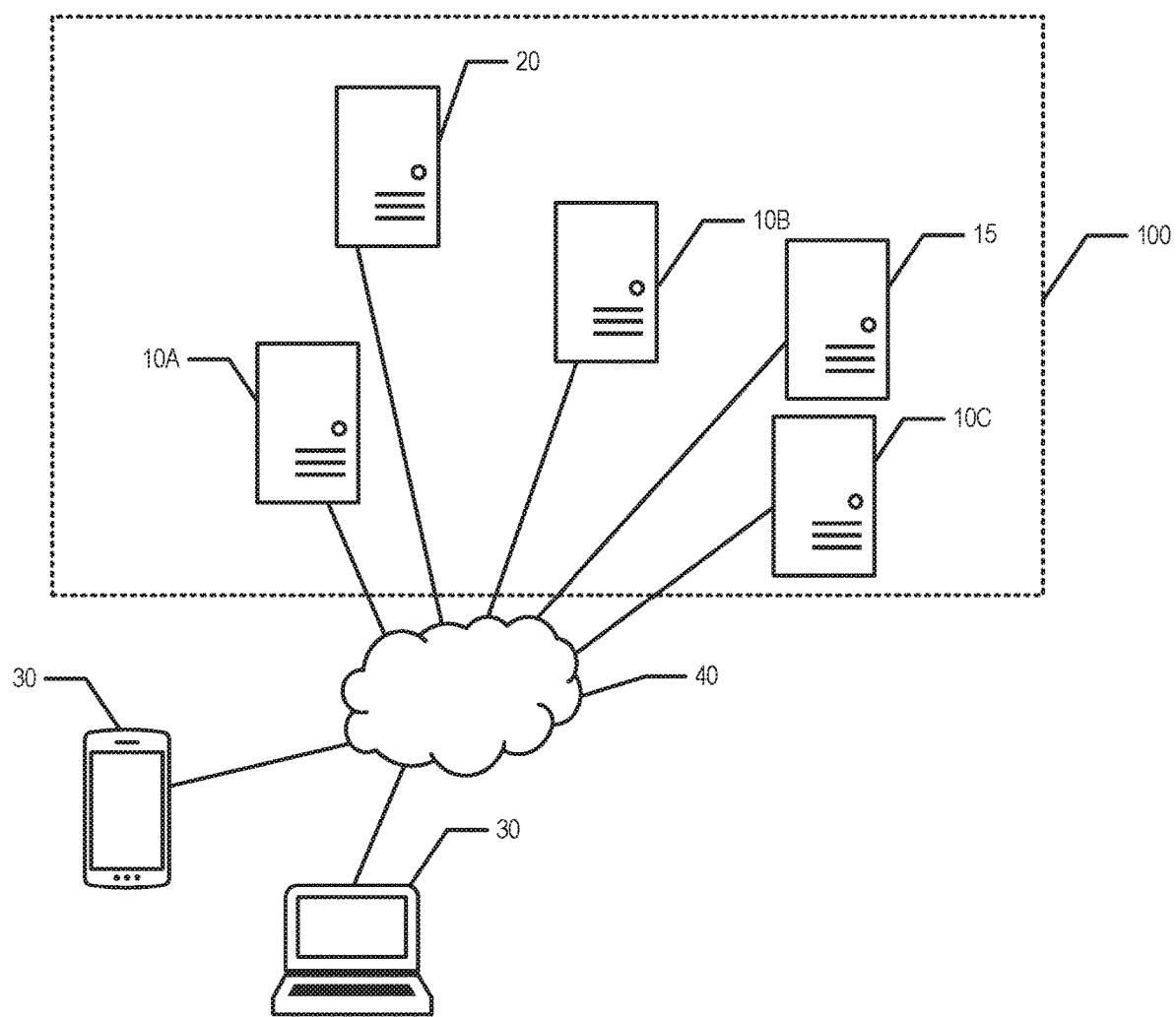
FIG. 1A is a diagram of a system that can be used to practice various embodiments of the present invention.
Figure 1B:
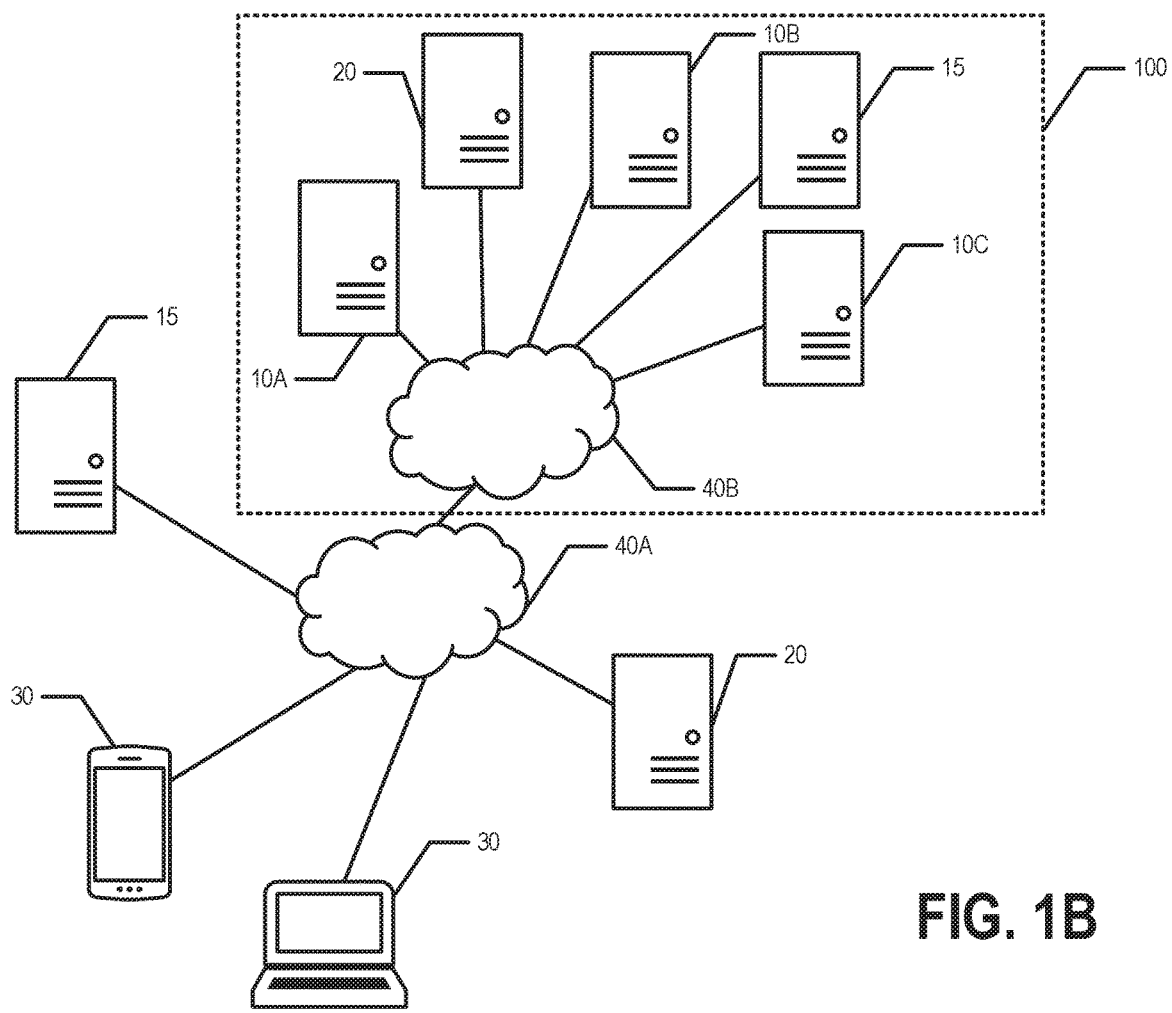
FIG. 1B is a diagram of another system that can be used to practice various embodiments of the present invention.

FIG. 1A provides an illustration of a system that can be used in conjunction with various embodiments of the present invention. As shown in FIG. 1A, the platform/system may comprise a distributed ledger platform/system 100 comprising a plurality of node computing entities 10 (e.g., 10A, 10B, 10C). In various embodiments, the node computing entities 10 are nodes of the distributed ledger of the distributed ledger platform/system 100. In various embodiments, the distributed ledger platform/system 100 further comprises one or more oracle computing entities 15, one or more data warehouse computing entities 20, and/or the like. As shown in FIG. 1A, the platform/system may further comprise one or more user computing entities 30, one or more networks 40, and/or the like. FIG. 1B provides an illustration of another system that can be used in conjunction with various embodiments of the present invention. As shown in FIG. 1B, the platform/system may comprise a distributed ledger platform/system 100 comprising a plurality of node computing entities 10 (e.g., 10A, 10B, 10C) and one or more internal and/or private networks 40B. For example, in an example embodiment, the distributed ledger platform/system 100 comprises a two or more node computing entities 10A and 10B in communication with one another via an internal and/or private network 40B. For instance, the internal and/or private network 40B may be an internal or private network. As shown in FIG. 1B, the platform/system may further comprise one or more user computing entities 30, one or more oracle computing entities 15, one or more data warehouse computing entities 20, one or more other and/or external networks 40A, and/or the like. For example, the other and/or external network 40A may be external, public, and/or a different network from the internal and/or private network 40B. For instance, the external network 40A may be the Internet. Each of the components of the platform/system may be in electronic communication with, for example, one another over the same or different wireless or wired networks 40, 40A, 40B including, for instance, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

Figure 2:
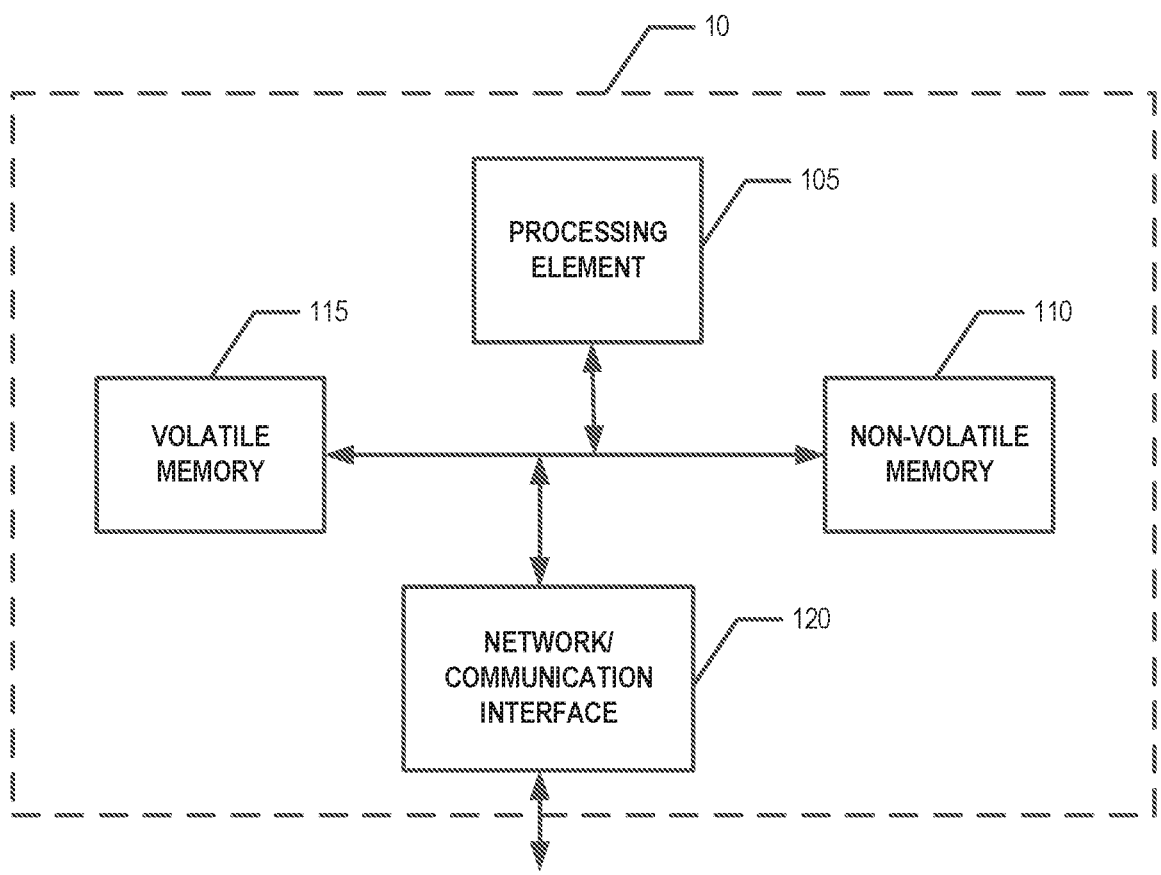
FIG. 2 is a schematic of a node computing entity in accordance with certain embodiments of the present invention.

FIG. 2 provides a schematic of a node computing entity 10 according to one embodiment of the present invention. The node computing entities 10 are associated with each actor that participates in the distributed ledger platform/system 100, in an example embodiment. For example, in a distributed ledger platform/system 100 for managing the licensing of intellectual property the nodes may be associated with the licensor of the intellectual property, licensee of the intellectual property, engineering contractor, equipment vendors, and installers. Other node computing entities and/or actors could also be contemplated, depending on the number of participants in the distributed ledger platform/system 100.

In general, the terms node computing entity, computing entity, entity, device, system, and/or similar words used herein interchangeably may refer to, for example, one or more computers, computing entities, desktop computers, mobile phones, tablets, phablets, notebooks, laptops, distributed ledger systems, items/devices, terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for instance, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In various embodiments, a node computing entity 10 is operated by and/or on behalf of an entity, individual, organization, department of an organization, and/or the like that managing one or more projects corresponding to one or more facilities via the platform/system 100 provided by the distributed ledger platform/system 100. In an example embodiment, some or all of the node computing entities 10 are nodes of the distributed ledger of the distributed ledger platform/system 100. For example, a node of a distributed ledger may store a copy of the distributed ledger, participate in consensus and/or voting functions for the distributed ledger, supply instances of information/data for recording in the distributed ledger, access instances of information/data from the distributed ledger, communicate with one or more oracle computing entities 15 and/or data warehouse computing entities 20, and/or the like.

As indicated, in one embodiment, the node computing entity 10 may also include one or more network and/or communications interfaces 120 for communicating with various computing entities, such as by communicating data, content, information, and/or similar terms used herein interchangeably that can be transmitted, received, operated on, processed, displayed, stored, and/or the like. For instance, the node computing entity 10 may communicate with other node computing entities 10, one or more user computing entities 30, and/or the like.

As shown in FIG. 2, in one embodiment, the node computing entity 10 may include or be in communication with one or more processing elements 105 (also referred to as processors, processing circuitry, and/or similar terms used herein interchangeably) that communicate with other elements within the node computing entity 10 via a bus, for instance. As will be understood, the processing element 105 may be embodied in a number of different ways. For example, the processing element 105 may be embodied as one or more complex programmable logic devices (CPLDs), microprocessors, multi-core processors, coprocessing entities, application-specific instruction-set processors (ASIPs), and/or controllers. Further, the processing element 105 may be embodied as one or more other processing devices or circuitry. The term circuitry may refer to an entirely hardware embodiment or a combination of hardware and computer program products. Thus, the processing element 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 105 may be configured for a particular use or configured to execute instructions stored in volatile or non-volatile media or otherwise accessible to the processing element 105. As such, whether configured by hardware or computer program products, or by a combination thereof, the processing element 105 may be capable of performing steps or operations according to embodiments of the present invention when configured accordingly.

In one embodiment, the node computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 110 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules/engines, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 115 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules/engines, scripts, source code, object code, byte code, compiled code, interpreted code, machine code, executable instructions, and/or the like being executed by, for instance, the processing element 105. Thus, the databases, database instances, database management system entities, data, applications, programs, program modules/engines, scripts, source code, object code, byte code, compiled code, interpreted code, machine code, executable instructions, and/or the like may be used to control certain aspects of the operation of the node computing entity 10 with the assistance of the processing element 105 and operating system.

As indicated, in one embodiment, the node computing entity 10 may also include one or more network and/or communications interfaces 120 for communicating with various computing entities, such as by communicating data, content, information, and/or similar terms used herein interchangeably that can be transmitted, received, operated on, processed, displayed, stored, and/or the like. For instance, the node computing entity 10 may communicate with computing entities or communication interfaces of other node computing entities 10, and/or the like.

As indicated, in one embodiment, the node computing entity 10 may also include one or more network and/or communications interfaces 120 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 10 components may be located remotely from other node computing entity 10 components, such as in a distributed ledger system. Furthermore, one or more of the components may be combined and additional components performing functions described herein may be included in the node computing entity 10. Thus, the node computing entity 200 can be adapted to accommodate a variety of needs and circumstances.

In example embodiments, the node computing entity 10 may be in communication with one or more other node computing entities 10, one or more oracle computing entities 15, one or more data warehouse computing entities 20, and/or one or more user computing entities 30. In example embodiments, the node computing entity 10 may be in communication with one or more other node computing entities 10 configured for submitting instances of information/data; validating instances of information/data; accessing and/or providing access to instances of information/data; managing time dependent values of data assets within the distributed ledger (e.g., instances of information/data), tokens, and/or data access costs; performing consensus processing; storing a copy of a distributed ledger; and/or the like. In an example embodiment, the distributed ledger is a blockchain. In an example embodiment, each node of the distributed ledger of the distributed ledger platform/system 100 is contained on the same server as the distributed ledger system, for example, a cloud server hosted by a single provider.

b. Exemplary Oracle Computing Entity

In various embodiments, an oracle computing entity 15 is a computing entity that operates one or more programs and/or machine users (e.g., via the execution of computer executable instructions, application program code, and/or the like) configured to act as an oracle of the distributed ledger of the distributed ledger platform/system 100. An oracle is an agent (e.g., program and/or machine user) that finds and verifies real-world occurrences of information/data and submits this information/data to the distributed ledger of the distributed ledger platform/system 100 to be used by smart contracts of the platform/system 100. In various embodiments, the oracle operating on the oracle computing entity 15 is responsible for checking initial vendor credentials, certifications, and regulatory compliance. The oracle computing entity 15 can be contained within the distributed ledger platform/system 100 or can reside outside the distributed ledger platform/system 100 and interact through, for example, an API. One example of an oracle is Securrency's RegTex™ credentialing software. In various embodiments, an oracle computing entity 15 comprises one or more components that are similar to a node computing entity 10. For example, an oracle computing entity 15 may comprise a processing element, volatile and/or non-volatile memory, a network and/or communications interface, and/or the like. In various embodiments, a node computing entity 10 may be an oracle computing entity 15.

c. Exemplary Data Warehouse Computing Entity

In various embodiments, a data warehouse computing entity 20 is a computing entity configured to store a data warehouse. In various embodiments, the data warehouse is configured to store (e.g., in volatile and/or non-volatile and/or non-transitory computer-readable memory) one or more documents corresponding to a project. For example, the data warehouse computing entity 20 may store design drawings, specification sheets, basic engineering packages, standard operating procedures, and/or other documents corresponding to a project (e.g., constructing a facility, operating/maintaining a facility, and/or the like). In various embodiments, the data warehouse computing entity 20 may store a most recent and/or up-to-date version of one or more documents and provide access to the documents stored in the data warehouse via the distributed ledger platform/system 100 (e.g., as controlled by the document access module/engine 416 and/or permissioning/access control module/engine 426 (shown in FIG. 4). In various embodiments, the data warehouse computing entity 20 is operated by and/or on behalf of the same entity as one or more of the node computing entities 10. The one or more data warehouse computing entities 20 store electronic versions of documents that do not reside on the distributed ledger. In various embodiments, access to the documents stored in by the data warehouse computing entity 20 is controlled and tracked by the distributed ledger platform/system 100 (e.g., the distributed ledger of the distributed ledger platform/system 100). For example, documents can reside in an inter-planetary file system. In various embodiments, a node computing entity 10 and/or oracle computing entity 15 may be a data warehouse computing entity 20. In various embodiments, a data warehouse computing entity 20 comprises one or more components that are similar to a node computing entity 10. For example, a data warehouse computing entity 20 may comprise a processing element, volatile and/or non-volatile memory, a network and/or communications interface, and/or the like.

d. Exemplary User Computing Entity

Figure 3:
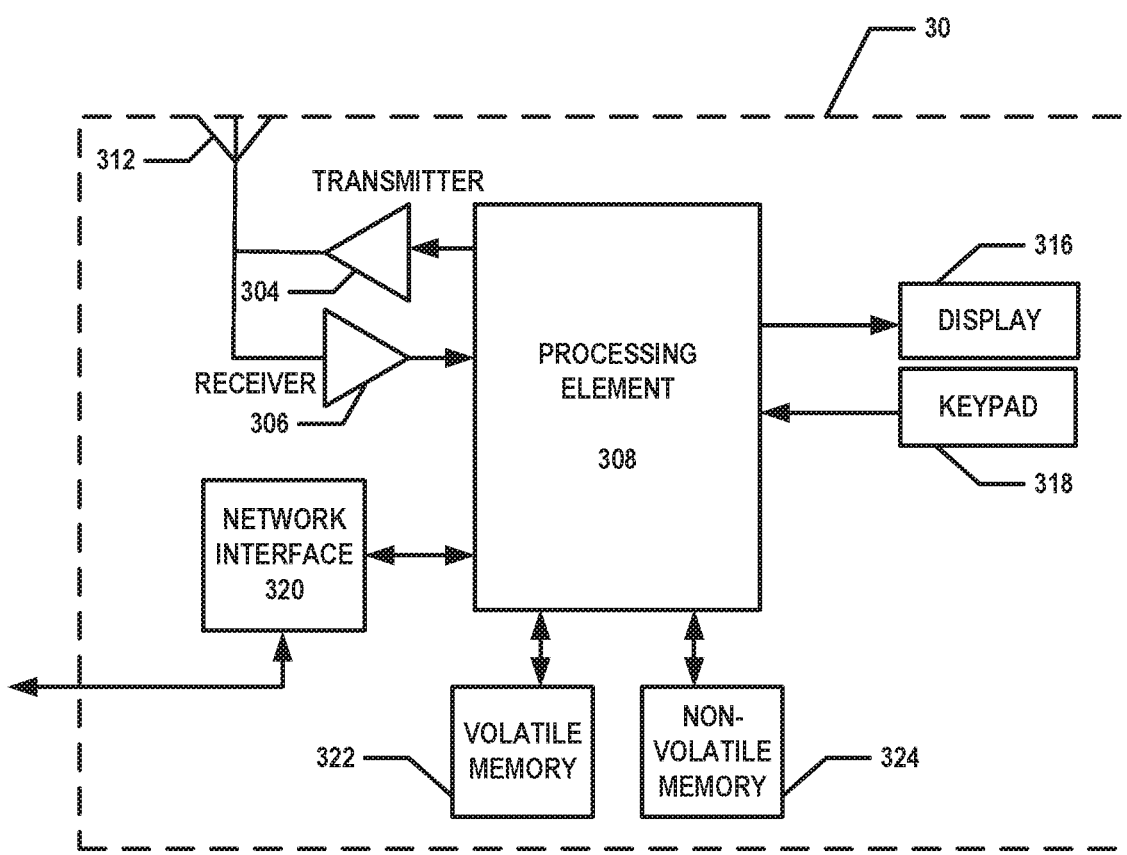
FIG. 3 is a schematic of a user computing entity in accordance with certain embodiments of the present invention.

FIG. 3 provides an illustrative schematic representative of a user computing entity 30 that can be used in conjunction with embodiments of the present invention. In various embodiments, a user is an individual that is associated with a project. In an example embodiment, the user may be a project manager, facility manager, a vendor, and/or other entity associated with a project. In various embodiments, a user computing entity 30 is configured to provide an IUI for interaction with by a user for accessing information/data from and/or providing information/data to the distributed ledger platform/system 100 and/or the distributed ledger of the distributed ledger platform/system 100. As shown in FIG. 3, a user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as anode computing entity 10, one or more other user computing entities 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

In various embodiments, the user computing entity 30 may also include one or more network interfaces 320 for communicating with various computing entities, such as by communicating data, content, information, and/or similar terms used herein interchangeably that can be transmitted, received, operated on, processed, displayed, stored, and/or the like. For instance, the user computing entity 30 may communicate with one or more node computing entities 10, other user computing entities 30, and/or the like.

Via these communication standards and protocols, the user computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module/engine Dialer (SIM dialer). The user computing entity 30 can also download changes, add-ons, and updates, for instance, to its firmware, software (e.g., including executable instructions, applications, program modules/engines), and operating system.

According to one embodiment, the user computing entity 30 may include location determining aspects, devices, modules/engines, functionalities, and/or similar words used herein interchangeably. For example, the user computing entity 30 may include outdoor positioning aspects, such as a location module/engine adapted to acquire, for instance, latitude, longitude, altitude, geocode, course, direction, heading, speed, UTC, date, and/or various other information/data. In one embodiment, the location module/engine can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 30 position in connection with a variety of other systems, including cellular towers, Wi-Fi access points, and/or the like. Similarly, the user computing entity 30 may include indoor positioning aspects, such as a location module/engine adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops), and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For instance, the user output interface may be configured to provide an application, browser, user interface, interface, dashboard, screen, webpage, page, and/or similar words used herein interchangeably executing on and/or accessible via the user computing entity 30 to cause display or audible presentation of information/data and for user interaction therewith via one or more user input interfaces. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules/engines, scripts, source code, object code, byte code, compiled code, interpreted code, machine code, executable instructions, and/or the like to implement the functions of the user computing entity 30.

In example embodiments, the user computing entity 30 may be in communication with one or more node computing entities 10 and/or one or more other user computing entities 30. In example embodiments, the user computing entity 30 may be in communication with one or more other node computing entities 10 configured for submitting instances of information/data to and/or accessing instances of information/data from the distributed ledger platform/system 100 and/or the distributed ledger of the distributed ledger platform/system 100.

e. Exemplary Networks

In one embodiment, any two or more of the illustrative components of the architecture of FIGS. 1A and/or 1B may be configured to communicate with one another via respective communicative couplings to one or more networks 40. The networks 40 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 40 may have any suitable communication range associated therewith and may include, for instance, global networks (e.g., the Internet), MANs, WANs, LANs, or PANs. In addition, the networks 40 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

IV. EXEMPLARY SYSTEM OPERATION

Figure 4:
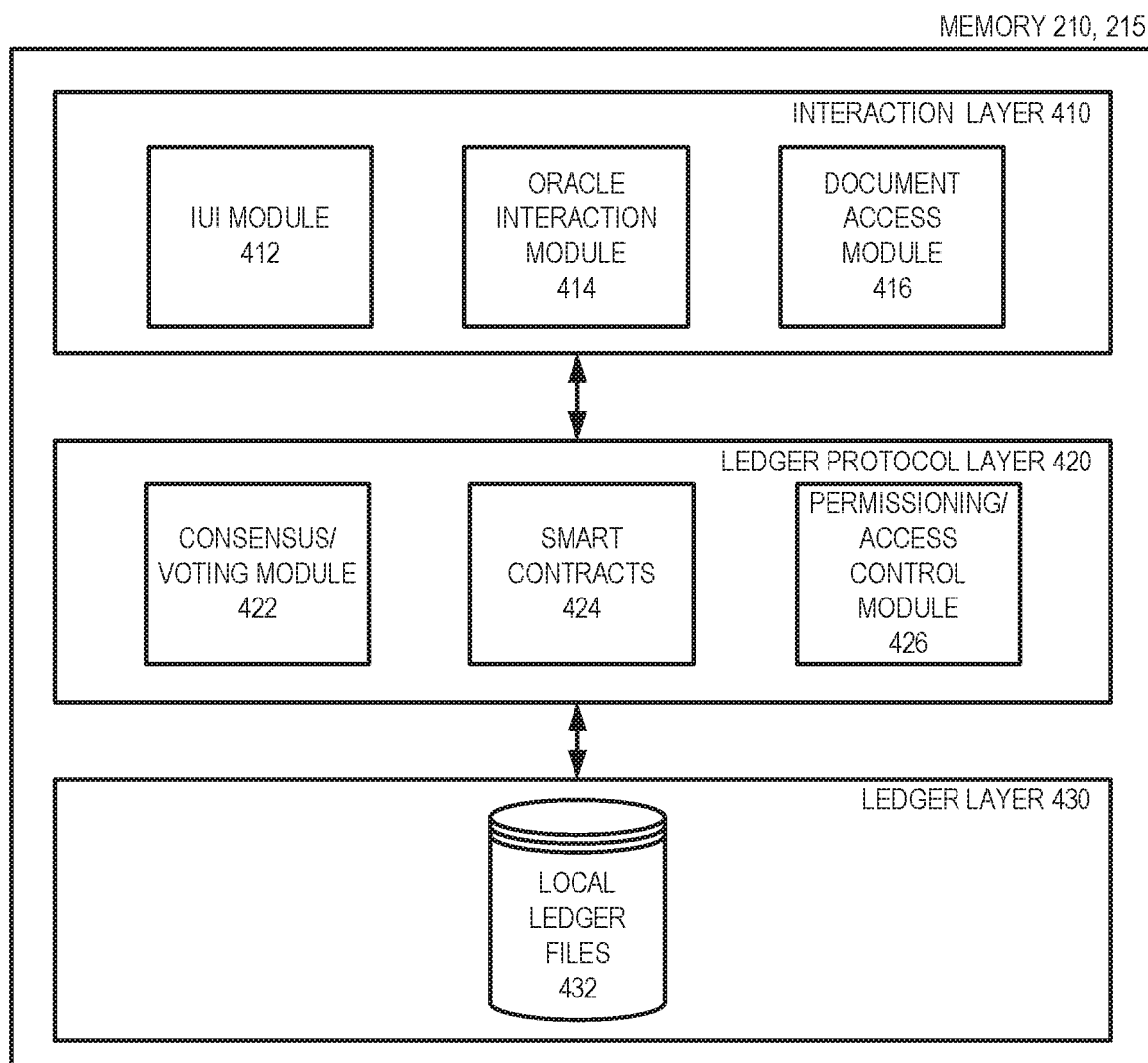
FIG. 4 is a schematic illustration of the distributed ledger system, in accordance with an example embodiment of the present invention.

FIG. 4 illustrates an example schematic diagram of modules/engines of the platform/system stored in memory 110, 115 of a node computing entity 10 (and/or other computing entities). Each of the modules/engines provide functionality to the distributed ledger platform/system 100. The interaction layer 410 comprises an IUI module/engine 412, an oracle interaction module/engine 414, and a document access module/engine 416. The IUI module/engine 412 comprises executable computer code that, when executed by a processing element (e.g., 205, 308), causes a user interface of the node computing entity 10 and/or a user interface of a user computing entity 30 to provide an IUI for a user to provide instances of information/data to and/or for a user to view and/or consume instances of information/data accessed via the distributed ledger platform/system 100. The oracle interaction module/engine 414 is configured to communicate with one or more oracles (e.g., operation on oracle computing entities 15). The document access module/engine 416 is configured to control access to one or more documents stored in a data warehouse stored by a data warehouse computing entity 20.

The ledger protocol layer 420 comprises modules/engines configured to act as intermediaries between the IUI module/ engine 412, oracle interaction module/engine 414, document access module/engine 416 and the distributed ledger itself. For instance, the ledger protocol layer 420 may comprise a consensus/voting module/engine 422, one or more smart contracts 424, a permissioning/access control module/engine 426, and/or the like. For example, the consensus/voting module/engine 422 may be configured to perform a consensus and/or voting process on instances of information/data to be recorded/stored (e.g., committed) to the distributed ledger (e.g., written to the local distributed ledger files 432). In various embodiments, the one or more smart contracts 424 comprise one or more self-executing contracts configured to access information/data from the distributed ledger, one or more oracles, and/or the data warehouse; cause the performance of one or more transactions and/or events; submit instances of information/data for recording in the distributed ledger; and/or the like. In various embodiments, the permissioning/access control module/engine 426 may be configured to control which users are provided with access to which instances of information/data stored in the distributed ledger and/or which documents and/or portions thereof stored in the data warehouse. In various embodiments, the permissioning/access control module/engine 426 may consider a user identifier and/or authentication information/data, credentialing information/data, a task and/or sub-project, and/or the like associated with a user to determine whether the user requires access to an instance of information/data stored in the distributed ledger and/or document and/or portion thereof stored in the data warehouse and whether the user has the credentials to access the same. Thus, the modules/engines of the ledger protocol layer 420 control the recording of information/data to the distributed ledger and the access of information/data from the distributed ledger.

In various embodiments, the ledger layer 430 comprises local ledger files 432. The local ledger files 432 comprise a copy of the distributed ledger stored by the node computing entity 10.

Each node of the distributed ledger may comprise a complete record of all relevant transactions that occur on and/or through the distributed ledger platform/system 100 and/or that are committed to the distributed ledger platform/system 100. Transaction consensus is achieved by each node reconciling the actors to the transaction and verifying that they can partake in the transaction. For example, if a vendor (e.g., a user operating a user computing entity 30 and associated with the vendor) desires access to certain design documents, the distributed ledger platform/system 100 will first determine if the vendor exists by checking its public and private keys with those stored in the platform/system (note this assumes the vendor has achieved the initial credential check, via the permissioning/access control module/engine 426). Next, the platform/system will determine what tasks the vendor is currently working on and/or which tasks are assigned to the vendor and match/satisfy this information/data with the rights stored in the platform/system (e.g., via the document access module/engine 416). For example, if a vendor desires foundation or ground work design documents for a building, but is only credentialed to install piping, then the distributed ledger platform/system 100 will reject the vendor's request. The rejection occurs via a consensus mechanism amongst each node, and the rejection is stored in the platform/system. For example, the platform/system may employ a transaction verification (e.g., consensus or voting process such as consensus/voting module/engine 422) for verifying transactions and for ensuring that one or more parties of a transaction have the appropriate credentials for participating in the transaction. The current version of a document and/or portion of a document and/or other instance(s) of information/data will always be provided to appropriately authorized project participants (e.g., users operating user computing entities 30 and associated with the appropriately authorized project participants).

Similar mechanisms are also used for payments. Again, the platform/system will verify a vendor's credentials via public and private keys. Once verified, the platform/system will obtain payment information/data (e.g. ACH, SWIFT, and/or the like) that is stored on each node, determine the amount to be paid and reconcile the amount via consensus on each node, and make the payment through self-executing contracts (e.g., smart contracts 424).

In the case of credential and regulatory information, the owner of the data/information will be able to provide relevant information/data just once and then make it available to other parties as needed using the distributed ledger platform/system 100 (e.g., the distributed ledger of the distributed ledger platform/system 100).

Some example projects including the planning and constructing of a new facility, operating a facility, and/or the like. For example, when the project is the planning and constructing of a new facility, the distributed ledger platform/system 100 may be configured to credential vendors, control access to documents and/or portions of documents, manage and/or perform payments, store information/data and documents related to the planning and constructing of the new facility, and/or the like. In various embodiments, when the project is the operating facility, the distributed ledger platform system 100 may be configured to credential vendors; control access to documents and/or portions of documents; manage and/or perform payments; collect and store information/data and documents related to the maintenance of the facility, operation of the facility, regulation compliance; planning and managing upgrades and/or expansions of facility; improving the productivity and/or turnarounds of the facility; and/or the like.

By becoming the primary method of collecting and sharing information/data about progress of the project (e.g., completion of benchmarks, tasks, and/or sub-projects of the project), the platform will facilitate effective project management, controlled information/data dissemination, and efficient information/data collection. Information/data can be analyzed to provide insights that enable future improvements. The information/data may be used by the project participants or sold to third-parties.

a. Exemplary Constructing a Facility Project

In various embodiments, a project may be for constructing a facility. In various embodiments, the project comprises a plurality of tasks, sub-tasks, projects, sub-projects, and/or the like, such as ground work, framing, plumbing, electrical, sprinkler installation, manufacturing machine installation, and/or the like. The plurality of tasks, sub-tasks, projects, sub-projects, and/or the like may be referred to individually and/or collectively herein. Various tasks, sub-tasks, projects, sub-projects, and/or the like may be performed by different vendors. As used herein, a vendor is contractor, sub-contractor, skilled tradesperson, organization employing or contracting skilled tradespeople and/or laborers, laborers, and/or the like that is hired (or is being considered for hiring) for performing one or more tasks, sub-tasks, projects, sub-projects, and/or the like of the project. For example, a vendor may be a plumber and/or a plumbing firm that is being hired to install the plumbing for the new facility and install the sprinkler system. In order to perform installation of the plumbing for the new facility, the vendor will need access to some, but likely not all, of the basic engineering project, design drawings, specification sheets, and/or other documents corresponding to the project. For example, the vendor may need access to the sprinkler system design documents and/or portions of documents relating to the sprinkler system and plumbing design documents and/or portions of documents relating to the plumbing of the new facility. However, the vendor performing the plumbing and sprinkler system installation may not need access to the information/data corresponding to the installation of manufacturing machines, the implementation of patented or trade secret methods in the new facility, and/or the like. Thus, the platform may be configured to control access to the documents corresponding to the project by ensuring that vendors have appropriate credentials to perform the tasks, sub-tasks, projects, sub-projects, and/or the like assigned to the vendors, ensuring that vendors only have access to the documents and/or portions of documents needed to perform the tasks, sub-tasks, projects, sub-projects, and/or the like assigned to the vendors, cause payment of vendors for performing the tasks, sub-tasks, projects, sub-projects, and/or the like assigned to the vendors and/or reaching benchmarks of the tasks, sub-tasks, projects, sub-projects, and/or the like assigned to the vendors, and/or the like.

As should be understood, the below description of various aspects of how the distributed ledger platform/system 100 may be used in managing various aspects of a project with relation to the planning and constructing of a new facility may also relate to various other types of projects (e.g., the operation of a facility and/or other projects).

i. Vendor Credentialing

In various embodiments, a distributed ledger platform/system 100 may be used to determine if a vendor has appropriate credentials to be hired and/or contracted to perform one or more tasks, sub-tasks, projects, sub-projects, and/or the like. FIG. 5 provides a flowchart illustrating various procedures, processes, operations, and/or the like performed via the distributed ledger platform/system 100 for determining if vendor has appropriate credentials to be hired and/or contracted to perform one or more tasks, sub-tasks, projects, sub-projects, and/or the like.

Starting at step/operation 502, a vendor query is received. For example, a node computing entity 10 may receive a vendor query. In an example embodiment, a user may operate a user computing entity 30 to cause the user computing entity 30 to provide a vendor query such that one or more node computing entities 10 receive the vendor query. For instance, a user operating a user computing entity 30 may access a user portal (e.g., through a web browser, app, portal, interface, and/or the like) and provide information/data corresponding to a vendor query.

For example, the distributed ledger platform/system 100 may provide an IUI which may provide the user (e.g., via a user interface of the user computing entity 30) with a vendor credentialing request view 600, an example of which is provided in FIG. 6. The user may operate the user computing entity 30 to provide and/or select information/data for one or more information/data fields 602. For example, the data/information fields 602 may include a vendor name information/data field configured to receive a vendor name. In another example, the data/information fields 602 may include a task or sub-project information/data field configured to receive a task or sub-project to be assigned and/or considering for assignment to be performed by the vendor. In an example embodiment, the task or sub-project information/data field may provide the user with a list of selectable tasks or projects. In an example embodiment, the data/information fields 602 may include a location information/data field configured to receive information/data corresponding to the location where the vendor will be working to perform the task or sub-project. For example, if a facility is being constructed, some of the tasks or projects will need to take place at the site of the new facility (e.g., plumbing the facility, and/or the like) while some of the tasks or projects may take place in other locations (which may even be in other countries) and a product of the task or sub-project may be later transported to the new facility (e.g., manufacturing machinery to be used in the new facility). After the user has operated the user computing entity 30 to enter and/or select the information/data in the data/information fields 602, the user may operate the user computing entity 30 to select the selectable submit element 604 of the IUI (e.g., via a user input interface).

Responsive to receiving user input selecting the selectable submit element 604, the user computing entity 30 may generate a vendor query based at least in part on the user provided and/or selected information/data and provide the vendor query such that a node computing entity 10 receives the vendor query. In various embodiments, the vendor query comprises information/data identifying the vendor (e.g., vendor ID, name, street address, mailing address, phone number, email address, business license number, and/or the like), one or more tasks or projects that may be assigned to the vendor, a location where the tasks or projects would be performed by the vendor, a private and/or public key identifier identifying a private and/or public key associated with the vendor, and/or the like.

Returning to FIG. 5, at step/operation 504, one or more information/data types corresponding to the task or sub-project provided and/or selected by the user may be identified. For example, the documents and/or portions of documents relating to the project (e.g., design diagrams, specification sheets, basic engineering package, and/or the like) that would need to be provided to the vendor to perform the one or more tasks or projects of the vendor query are identified. In an example embodiment, the documents and/or portions of documents relating to the project may be annotated to indicate which documents and/or portions of documents relate to each task or sub-project. For example, a project manager, and/or the like may have annotated the documents and/or portions of documents relating to the project (e.g., stored in a data warehouse of the data warehouse computing entity 20) to indicate which documents and/or portions of documents relate to each task or sub-project. In an example embodiment, the documents and/or portions of documents relating a task or sub-project may be automatically determined based at least in part on analysis of document titles, section headers, sub-section headers, keywords in the text, and/or the like using a natural language processing engine, a machine learning trained model, Boolean query, and/or the like.

Once the documents and/or portions of documents relating to the task(s), sub-task(s), project(s), sub-project(s), and/or the like provided in the vendor query, access/sharing rules regarding access to those documents and/or portions of documents may be identified, determined, and/or the like, at step/operation 506. For example, the access/sharing rules may be configured to control access to sensitive information/data, such as IP (e.g., trade secrets, patented technology, design drawings, P&IDs, technology that is protected, technology and/or information/data that is subject to export controls, and/or the like). In various embodiments, one or more classes of access/sharing rules may be defined. For example, each document and/or portion of a document may be assigned a sensitivity category/class corresponding to a class of access/sharing rules. For example, the documents and/or portions of documents may be annotated with a sensitivity category/class for the document and/or portion of the document. For example, a plumbing diagram illustrating the plumbing of restrooms in the facility may be assigned a low sensitivity category/class while the specifications for building and/or installing a manufacturing machine that embodies trade secret technology may be assigned a high sensitivity category/class. In an example embodiment, the documents and/or portions of documents may be annotated with corresponding sensitivity categories/classes by project manager, and/or the like. In an example embodiment, the sensitivity category/class of a document and/or portion thereof may be automatically determined based at least in part on an automated, semi-automated, and/or manual analysis of the content of the document and/or portion of the document. For example, the analysis of the content of the document and/or portion of the document may be performed by a machine learning-trained sensitivity category/class assignment model. For example, the node computing entity 10 may identify and/or determine the access/sharing rules corresponding to the documents and/or portions of documents associated with the task(s), sub-task(s), project(s), sub-project(s), and/or the like provided in the vendor query.

At step/operation 508, it is determined whether vendor information/data corresponding to the vendor identified in the vendor query (e.g., by vendor ID, name, street address, mailing address, phone number, email, business license, and/or the like) is available in the distributed ledger of the distributed ledger platform/system 100. For example, when vendor information/data is acquired from outside of the distributed ledger of the distributed ledger platform/system 100 (e.g., by an oracle operating on an oracle computing entity 15), a vendor information/data transaction may be committed to the distributed ledger, in an example embodiment. For example, the vendor information/data acquired from outside of the distributed ledger of the distributed ledger platform/system 100 may be committed to the distributed ledger (e.g., via a vendor information/data transaction) such that the vendor information/data does not need to be reacquired (though it may be checked from time to time to ensure that vendor information/data is still accurate). For example, a node computing entity 10 (and/or multiple node computing entities 10 in accordance with the voting/consensus process of the distributed ledger of the distributed ledger platform/system 100) will first determine if the vendor exists in the distributed ledger platform/system 100 by checking a public and private keys associated with the vendor (e.g., in the vendor query or by looking up the vendor in a database or table) with those stored in the distributed ledger platform/system 100 (e.g., via the permissioning/access control module/engine 426).

When, at step/operation 508, it is determined that the vendor information/data is available via the distributed ledger (e.g., an initial credentialing check has already been performed for the vendor), the vendor information/data is accessed from the distributed ledger platform/system 100, at step/operation 510. For example, responsive to determining that the vendor information/data corresponding to the vendor has already been written to the distributed ledger of the distributed ledger platform/system 100, the vendor information/data corresponding to the vendor may be accessed form the distributed ledger. For example, a node computing entity 10 may access the vendor information/data corresponding to the vendor from the distributed ledger of the distributed ledger platform/system 100. In various embodiments, the vendor information/data may include contact information/data (e.g., vendor name, mailing address, street address, phone number email, and/or the like) and credentialing information/data (e.g., a business license number for the vendor, information/data regarding the nationalities of one or more employees of the vendor, business credentials of the vendor, business insurance information/data for the vendor contact information/data for the vendor, and/or the like).

When, at step/operation 508, it is determined that vendor information/data corresponding to the vendor is not available via the distributed ledger of the distributed ledger platform/system 100, it is determined that the initial credentialing check has not yet been performed for the vendor. At step/operation 512, the node computing entity 10 may perform the initial credentialing check for the vendor. For example, the node computing entity 10 may generate and provide a credentialing request (e.g., via oracle interaction module/engine 414) such that an oracle operating on an oracle computing entity 15 receives the credentialing request. In various embodiments, the credentialing request includes information/data identifying the vendor (e.g., vendor ID, vendor name, street address, mailing address, phone number, email, business license number, and/or the like). The oracle may then communicate with one or more computing entities external to the distributed ledger platform/system 100 to access credentialing information/data for the vendor. For example, the credentialing information/data may include a business license for the vendor, information/data regarding the nationalities of one or more employees of the vendor, business credentials of the vendor, business insurance information/data for the vendor contact information/data for the vendor, and/or the like. The oracle computing entity 15 may then provide the credentialing information/data such that the node computing entity 10 receives the credentialing information/data.

At step/operation 514, it is determined whether the vendor has the appropriate credentials for performing the task(s), sub-task(s), project(s), sub-project(s), and/or the like provided in the vendor query and/or whether the vendor has the appropriate credentials for satisfying the access/sharing rules corresponding to documents and/or portions of documents required for performing the task(s), sub-task(s), project(s), sub-project(s), and/or the like provided in the vendor query. For example, in an example embodiment, a permissioning/access control module/engine 426 operating on and/or being executed by a node computing entity 10 determines whether the vendor has the appropriate credentials for performing the task(s), sub-task(s), project(s), sub-project(s), and/or the like provided in the vendor query and whether the credentialing information/data corresponding to the vendor satisfies the access/sharing rules associated with the documents and/or portions of documents corresponding to the task(s), sub-task(s), project(s), sub-project(s), and/or the like provided in the vendor query. For example, if the vendor is a licensed and insured plumber, it may be determined that the vendor has appropriate credentials for performing a plumbing task or sub-project. However, if the vendor is a licensed and insured electrician (but not a licensed plumber) or not a legitimate business entity, it may be determined that the vendor does not have the appropriate credentials for performing a plumbing task or sub-project. In another example, if the access/sharing rules indicate that the documents and/or portions of documents for which the vendor would need access to perform the task(s), sub-task(s), project(s), sub-project(s), and/or the like provided in the vendor query fall under export controls and the vendor's work team includes a foreign national that is prohibited access to the documents and/or portions of documents under the export controls, then it may be determined that the vendor does not satisfy the access/sharing rules corresponding to the documents and/or portions of documents required to perform the task(s), sub-task(s), project(s), sub-project(s), and/or the like provided in the vendor query. In various embodiments, this determination may be made as part of the consensus/voting process (e.g., performed by the consensus/voting module/engine 422) for recording a vendor information/data transaction to the distributed ledger of the distributed ledger platform/system 100.

When, at step/operation 514, it is determined that the credentialing information/data corresponding to the vendor is not appropriate and/or sufficient for performing the task(s), sub-task(s), project(s), sub-project(s), and/or the like provided in the vendor query or for accessing the documents and/or portions of documents required for performing the task(s), sub-task(s), project(s), sub-project(s), and/or the like provided in the vendor query, a vendor rejection may be provided, at step/operation 516. For example, the node computing entity 10 may generate and provide a vendor rejection. In various embodiments, the vendor rejection may simply indicate that the vendor is not appropriately credentialed for the task(s), sub-task(s), project(s), sub-project(s), and/or the like identified in the vendor query. In an example embodiment, the vendor rejection may identify why and/or how the vendor's credentials are lacking such that the vendor was determined to not be appropriately credentialed for performing the task(s), sub-task(s), project(s), sub-project(s), and/or the like identified in the vendor query. In various embodiments, the vendor rejection is provided such that the user computing entity 30 that provided the vendor query receives the vendor rejection. In an example embodiment, the user computing entity 30 may be configured to receive and process the vendor rejection, wherein processing the vendor rejection causes at least a portion of the contents of the vendor rejection to be provided via the IUI (e.g., via IUI module/engine 412) via a user interface of the user computing entity 30. In various embodiments, the vendor rejection is committed to the distributed ledger of the distributed ledger platform/system 100. For example, a vendor information/data transaction may be committed to the distributed ledger of the distributed ledger platform/system 100 comprising vendor information/data (e.g., vendor identifying information/data, vendor contact information/data, credentialing information/data), an indication that the vendor was not approved for one or more tasks or projects, the tasks or projects that were provided in the vendor query, and/or the like.

When, at step/operation 514, it is determined that the credentialing information/data corresponding to the vendor is appropriate and/or sufficient for performing the task(s), sub-task(s), project(s), sub-project(s), and/or the like provided in the vendor query or for accessing the documents and/or portions of documents required for performing the task(s), sub-task(s), project(s), sub-project(s), and/or the like provided in the vendor query, a vendor approval may be provided, at step/operation 518. For example, the node computing entity 10 may generate and provide a vendor approval. In various embodiments, the vendor approval indicates that the vendor is appropriately credentialed for the task(s), sub-task(s), project(s), sub-project(s), and/or the like identified in the vendor query. In an example embodiment, the vendor approval may include at least a portion of the vendor information/data corresponding to the vendor. In various embodiments, the vendor approval is provided such that the user computing entity 30 that provided the vendor query receives the vendor approval. In an example embodiment, the user computing entity 30 may be configured to receive and process the vendor approval, wherein processing the vendor approval causes at least a portion of the contents of the vendor approval to be provided via the IUI (e.g., via IUI module/engine 412) via a user interface of the user computing entity 30.

At step/operation 520, the vendor approval is committed to the distributed ledger of the distributed ledger platform/system 100. For example, one or more node computing entities 10 may cause a vendor information/data transaction to be written to the distributed ledger of the distributed ledger platform/system 100. For example, a vendor information/data transaction may be committed to the distributed ledger of the distributed ledger platform/system 100 comprising vendor information/data (e.g., vendor identifying information/data, vendor contact information/data, credentialing information/data), an indication that the vendor was approved to perform one or more tasks or projects, the tasks or projects that were provided in the vendor query, and/or the like. In various embodiments, a vendor profile corresponding to the vendor (e.g., comprising a public key and/or public key identifier, a private key and/or a private key identifier, vendor information/data, an indication of the task(s), sub-task(s), project(s), sub-project(s), and/or the like assigned to the vendor, and/or the like) may be generated and/or updated. For example, if a public key and/or private key corresponding to the vendor in the distributed ledger platform/system 100 has not yet been generated and/or assigned, a public key and/or private key may be generated and/or assigned to the vendor within the distributed ledger platform/system 100.

ii. Accessing Documents and or Portions of Documents

In various embodiments, a vendor may be hired and/or contracted to perform one or more tasks or projects of a project. In an example embodiment, the distributed ledger of the distributed ledger platform/system 100 is updated to indicate that the vendor has been hired and/or contracted to perform the one or more tasks or projects. For example, one or more smart contracts 424 may be generated, initiated, executed, and/or the like corresponding to a contract with the vendor for performing (e.g., carrying out or executing) the one or more tasks or projects. In various embodiments, the one or more smart contracts 424 may trigger, control, and/or the like payment of the vendor for performing (e.g., carrying out or executing) the tasks or projects, supplies for performing the tasks or projects, and/or the like.

In order to perform the one or more tasks or projects, the vendor may need access to one or more documents and/or portions of documents relating to the project. For example, the one or more documents and/or portions of documents that the vendor may need access to perform the task(s), sub-task(s), project(s), sub-project(s), and/or the like may be documents and/or portions of documents relating to portions of the project that correspond to the task(s), sub-task(s), project(s), sub-project(s), and/or the like to be performed by the vendor. For example, if the vendor is an electrician, the vendor may need access to documents and/or portions of documents that discuss the electrical requirements of the project, wiring diagrams, and/or the like. However, if the vendor is an electrician, the vendor may not need access to documents corresponding to the installation of manufacturing machinery to be installed at the facility. The distributed ledger platform/system 100 is configured, in various embodiments, to control the access to the documents related to the project (e.g., stored in a data warehouse of the data warehouse computing entity 20). For example, the distributed ledger platform/system 100 may be configured to only provide a vendor with access to documents and/or portions of documents that relate to the project that are directly related to tasks, sub-tasks, projects, sub-projects, and/or the like assigned to the vendor. For example, documents and/or portions of documents that directly relate to a task and/or sub-project provide content related to the task and/or sub-project such as diagrams, descriptions, instructions, illustrations, photographs, plans, and/or the like of the task or sub-project and/or a product of the task or sub-project.

In various embodiments, the documents and/or portions of documents stored in the data warehouse are annotated to include an indication of which task(s) or project(s) that document and/or portion of the document (e.g., section, sub-section, chapter, part, and/or the like of the document) relates to. For example, documents related to the project may be digitized into digital/electronic files such as, for example, into portable digital files (pdfs). In an example embodiment, documents may be digitized into one or more digital/electronic files such that each portion of the document (e.g., section or sub-section of the document) is stored in a separate digital/electronic file. Each digital/electronic file may be associated with metadata including an indication of the identity of the document and/or portion of the document, the indicating what the content of the document and/or portion of the document stored in the digital/electronic file is, an indication of what task(s), sub-task(s), project(s), sub-project(s), and/or the like the content of the document and/or portion of the document stored in the digital/electronic file relates to, an indication of the access/sharing rules and/or sensitivity category/class that correspond to the content of the document and/or portion of the document stored in the digital/electronic file, and/or the like. In an example embodiment, each document is digitized into one digital/electronic file and each portion of the document is associated with metadata including an indication of the identity of the portion of the document, the indicating what the content of the portion of the document is, an indication of what task(s), sub-task(s), project(s), sub-project(s), and/or the like the content of the portion of the document relates to, an indication of the access/sharing rules and/or sensitivity category/class that correspond to the content of the portion of the document, and/or the like. In such an example embodiment, each portion of the digital/electronic file corresponding to a portion of the document is separably providable. For example, if a vendor is to have access to section two of a particular document that is stored as one digital/electronic file, the data warehouse computing entity 20 may print the pages corresponding to section two of the particular document to pdf (or another digital/electronic file format) and provide those printed pages in response to a document request rather than providing the document itself.

As noted above, each document and/or portion of a document may be associated with access/sharing rules. The access/sharing rules may correspond to a level of sensitivity of the content of the document and/or portion of the document. For example, each document and/or portion of a document may be assigned a sensitivity category/class corresponding to a class of access/sharing rules. For example, the access/sharing rules may be configured to control access to sensitive information/data, such as IP (e.g., trade secrets, patented technology, technology that is protected, technology and/or information/data that is subject to export controls, and/or the like). In various embodiments, one or more classes of access/sharing rules may be defined.

In an example embodiment, the annotations regarding the content, related task(s), sub-task(s), project(s), sub-project(s), and/or the like, and/or corresponding access/sharing rules/sensitivity category/class of the document and/or portion of the document are assigned by a user operating a user computing entity 30, data warehouse computing entity 20, and/or the like. In an example embodiment, the annotations regarding the content, related task(s), sub-task(s), project(s), sub-project(s), and/or the like, and/or corresponding access/sharing rules/sensitivity category/class of the document and/or portion of the document are assigned by a machine user (e.g., operating on a node computing entity 10, data warehouse computing entity 20, and/or the like). For example, the machine user may be an application or program and/or may use a machine learning trained model, natural language processing engine, Boolean query, and/or the like. For example, the machine user may analyze document titles, section headers, sub-section headers, keywords in the text, metadata relating to the document, watermarks and/or "confidential" marks, and/or the like using a natural language processing engine, a machine learning trained model, Boolean query, and/or the like to automatically assign one or more related task(s), sub-task(s), project(s), sub-project(s), and/or the like to the documents and/or portions of the documents. In various embodiment, the same or a different machine user may automatically assign access/sharing rules/sensitivity categories/classes to the documents and/or portions of the documents. For example, the analysis of the content of the document and/or portion of the document may be performed by a machine learning-trained sensitivity category/class assignment model. For example, the node computing entity 10 may identify and/or determine the access/sharing rules corresponding to the documents and/or portions of documents. The annotations corresponding to a document and/or portion of a document may then be stored as metadata of the digital/electronic file storing the document and/or portion of the document.

In an example embodiment, annotations are not stored in association with the electronic/digital files storing the documents and/or portions of the documents and determinations regarding the task(s), sub-task(s), project(s), sub-project(s), and/or the like related to a document and/or portion of a document and/or the corresponding sensitivity category/class access/sharing rules may be determined in real time or near real time (e.g., by the node computing entity 10 and/or data warehouse computing entity 20) in response to receiving a request (e.g., a vendor query, document request, and/or the like). In an example embodiment, annotations are not stored in association with the electronic/digital files storing the documents and/or portions of the documents and determinations regarding the documents and/or portions of documents that relate to a particular task or sub-project. Further, the corresponding sensitivity category/class access/sharing rules may be determined in real time or near real time (e.g., by the node computing entity 10 and/or data warehouse computing entity 20) in response to receiving a request (e.g., vendor query, document request, and/or the like).

FIG. 7 provides a flowchart illustrating processes, procedures, operations, and/or the like performed by a node computing entity 10 of the distributed ledger platform/system 100 to provide a documents and/or portions of documents in accordance with an example embodiment. Starting at step/operation 702, a new document and/or a new/updated version of a document is received. For example, a node computing entity 10 may receive a new document and/or a new/updated version of a document. In various embodiments, the node computing entity 10 may cause the new document and/or new/updated version of the document to be stored in a data warehouse of a data warehouse computing entity 20 via a document storage transaction. A document storage transaction corresponding to the storing of the document may be committed to the distributed ledger of the distributed ledger platform/system 100. In an example embodiment, the document storage transaction may include the task(s), sub-task(s), project(s), sub-project(s), and/or the like related to each document and/or portion of the document and/or a sensitivity category/class access/sharing rules corresponding to each document and/or portion of the document. The consensus/voting module/engine 422 may check to ensure that the user providing the new document and/or new/updated version of the document has the appropriate credentials to provide a new document and/or new/updated version of a document as part of performing/recording the document storage transaction. In an example embodiment, the new document and/or new/updated version of the document may be stored in the data warehouse in an encrypted manner.

At some point in time after one or more documents and/or portions of documents have been stored in the data warehouse, user authentication information/data and a document request are received. For example, a node computing entity 10 may receive user authentication information/data and a document request. In various embodiments, the user authentication information/data may include information/data identifying the user (e.g., a username, for example) and one or more authenticators (e.g., password, private key, one time use password, limited time use code, biometric information/data, and/or the like configured to authenticate the identity of the user corresponding to the information/data identifying the user). In an example embodiment, the document request is an indication that the user is requesting to view one or more particular documents and/or documents and/or portions thereof related to a particular task or sub-project. In an example embodiment, the user may operate a user computing entity 30 to access a user portal (e.g., through a web browser, app, portal, interface, and/or the like). To enter the user portal (e.g., to access and/or provide information/data related to the project) the user may provide the authentication information/data (e.g., via user input interfaces of the user computing entity 30). The authentication information/data may then be provided to the node computing entity 10. Once the identity of the user identified by the information/data identifying the user (e.g., using the one or more authenticators), the user is provided with an IUI of the user portal that enables the user to access documents relating to the project, provide information/data relating to the project (e.g., completion of one or more benchmarks, request payment, and/or the like). In various embodiments, the user may initiate the document request via interaction with the IUI. For example, the user may select a document tab, document page, and/or the like of the IUI to view the documents accessible to the user. In another example, the user may access a document request page of the IUI and enter and/or select information/data to cause a document request to be submitted. Thus, based at least in part on user interaction with the IUI, a user computing entity 30 may generate and provide (e.g., transmit) a document request such that a node computing entity 10 receives the document request. In an example embodiment, the node computing entity 10 receives the document request in association with the user authentication information/data and/or information/data identifying the user and an indication that the user has been authenticated (e.g., an encryption key corresponding to the user).

At step/operation 706, responsive to receiving and/or processing the document request, the node computing entity 10 initiates a document access transaction via the distributed ledger of the distributed ledger platform/system 100. For example, the node computing entity 10 may submit a document access transaction identifying the user, an indication of the documents the user is attempting to access (e.g., identifiers of the documents themselves, the task(s), sub-task(s), project(s), sub-project(s), and/or the like that related documents are being requested for, and/or the like).

At step/operation 708, one or more documents and/or portions of documents are identified based at least in part on the document request. For example, the node computing entity 10 may identify one or more documents and/or portions of documents based at least in part on the document request. For example, the document request may indicate a particular document and/or portion of a document the user wishes to access. In another example the document request may indicate that the user would like to access documents and/or portions of documents related to a particular task or sub-project. In an example embodiment, the documents and/or portions of documents may be identified based at least in part on document storage transactions stored in the distributed ledger of the distributed ledger platform/system 100. In an example embodiment, the documents and/or portions of documents may be identified based at least in part on annotations stored in the metadata associated with the digital/electronic files storing the documents and/or potions of documents. For example, the node computing entity 10 may communicate with the data warehouse computing entity 20 to identify documents and/or portions of documents based at least in part on the document request. In another example embodiment, the node computing entity 10 and/or the data warehouse entity 20 may analyze the documents and/or portions of the documents in response to receiving the request to identify documents and/or portions of documents based at least in part on the document request.

At step/operation 710, the user credentials are accessed based at least in part on the user authentication information/data. For example, the permissioning/access control module/engine 426 may determine the user credentials corresponding to the user corresponding to the user authentication information/data. In an example embodiment, the node computing entity 10 determines the user credentials corresponding to the user corresponding to the user authentication information/data. In an example embodiment, the user credentials are accessed from a user profile stored in a user profile database (e.g., on the distributed ledger, by the node computing entity 10, by the data warehouse computing entity 20, and/or the like). In an example embodiment, the user credentials are accessed from the distributed ledger of the distributed ledger platform/system 100 (e.g., from one or more vendor information/data transactions committed to the distributed ledger).

At step/operation 712, it is determined if the user has appropriate credentials for accessing the identified one or more documents and/or portions of documents. For example, the sensitivity category/class associated with each of the identified one or more documents and/or portions of documents may be determined and/or accessed (e.g., from one or more document storage transactions stored to the distributed ledger, from metadata stored in association with a digital/electronic file storing the document and/or portion of the document, and/or the like). For example, the access/sharing rules corresponding to each of the identified one or more documents and/or portions of documents may be determined (e.g., based at least in part on the determined sensitivity category/class). The node computing entity 10 (and/or a plurality of node computing entities 10) may determine whether the user credentials of the user corresponding to the user authentication information/data satisfy the access/sharing rules corresponding to the identified documents and/or portions of documents. In various embodiments, determining whether the user credentials of the user satisfy the access/sharing rules corresponding to identified documents and/or portions of documents includes determining whether the identified documents and/or portions of documents are related to a task or sub-project associated with the user (e.g., assigned to a vendor associated with the user). In various embodiments, determining whether the user credentials of the user satisfy the access/sharing rules corresponding to the identified documents and/or portions of documents is performed as part of the consensus/voting process (e.g., by the consensus/voting module/engine 422) of the distributed ledger for performing and/or recording the document access transaction.

When, at step/operation 712, it is determined that the user credentials of the user corresponding to the user authentication information/data do not satisfy the access/sharing rules (e.g., the documents and/or portions of documents do not relate to a task or sub-project associated with the user, the user is not able to view documents and/or portions of documents of the sensitivity level corresponding to the documents and/or portions of the documents), the process continues to step/operation 714. At step/operation 714, the document access transaction is rejected. For example, the node computing entity 10 may determine that the document access transaction cannot be performed.

At step/operation 716, a lack of access notification is generated and provided. For example, the node computing entity 10 may generate and provide a lack of access notification such that the user computing entity 30 receives the lack of access notification. In an example embodiment, the lack of access notification indicates that the user is not permitted access to the requested documents and/or portions of documents. In an example embodiment, the user computing entity 30 may be configured to receive and process the lack of access notification, wherein processing the lack of access notification causes at least a portion of the contents of the lack of access notification and/or an error message to be provided via the IUI (e.g., via IUI module/engine 412) via a user interface of the user computing entity 30. In various embodiments, the lack of access notification is committed to the distributed ledger of the distributed ledger platform/system 100.

When, at step/operation 712, it is determined that the user credentials of the user corresponding to the user authentication information/data do satisfy the access/sharing rules (e.g., the documents and/or portions of documents do relate to a task or sub-project associated with the user, the user is able to view documents and/or portions of documents of the sensitivity level corresponding to the documents and/or portions of the documents), the process continues to step/operation 718. At step/operation 718, the document access transaction is performed and/or committed to the distributed ledger of the distributed ledger platform/system 100. In an example embodiment, performing the data/information access transaction includes providing the identified documents and/or portions of documents such that the identified one or more documents and/or portions of documents are received by the user computing entity 30. For example, the node computing entity 10 may access the identified one or more documents and/or portions of documents from the data warehouse of the data warehouse computing entity 20 and provide the identified one or more documents and/or portions of documents such that the user computing entity 30 receives the identified one or more documents and/or portions of documents. In an example embodiment, the node computing entity 10 may cause the data warehouse computing entity 20 to provide the identified one or more documents and/or portions of documents such that the user computing entity 30 receives the identified one or more documents and/or portions of documents. The user computing entity 30 may then provide access to the identified one or more documents and/or portions of documents via the IUI. For example, the user may operate the user computing entity 30 to open, view, read, and/or the like one or more of the identified one or more documents and/or portions of documents via the IUI (e.g., provided via the user interface of the user computing entity 30).

iii. Payments

In various embodiments, the distributed ledger platform/system 100 is configured to provide payment to vendors for reaching one or more benchmarks regarding tasks or projects assigned to the vendors. For example, a vendor may perform work toward completing a task or sub-project. In an example embodiment, the vendor may provide information/data regarding the vendor's actions and/or the work performed toward completing the task or sub-project. For example, the vendor may provide daily updated, weekly updates, monthly updates, and/or the like as appropriate for the task(s), sub-task(s), project(s), sub-project(s), and/or the like assigned to the vendor. For example, the vendor may access an update view of the IUI (e.g., via a user computing entity 30) and provide information/data regarding the work performed toward completing the task or sub-project since the vendor last provided an update. In an example embodiment, the vendor may provide an update upon reaching a predetermined benchmark in the process of completing the task or sub-project. In an example embodiment, the user computing entity 30 provides the information/data regarding the work performed toward completing the task or sub-project and/or achieving one or more benchmarks regarding the task or sub-project such that a node computing entity 10 receives the information/data. The node computing entity 10 may then record the information/data regarding the work performed toward completing the task or sub-project and/or achieving one or more benchmarks regarding the task or sub-project to the distributed ledger, a data file or worksheet stored in the data warehouse (e.g., by the data warehouse entity 20), and/or the like. In an example embodiment, a project manager, and/or the like (e.g., someone involved in the project but not he vendor) may provide the information/data regarding the work performed toward completing the task or sub-project and/or achieving one or more benchmarks regarding the task or sub-project.

In an example embodiment, the distributed ledger platform/system 100 (e.g., one or more node computing entities 10) may be configured to identify when a particular benchmark has been achieved (e.g., based at least in part on the information/data regarding the work performed toward completing the task or sub-project and/or achieving one or more benchmarks regarding the task or sub-project provided by the vendor and/or other user. For example, a smart contract 424 may trigger one or more payments to the vendor for achieving one or more benchmarks. For example, the smart contract 424 may determine when one or more benchmarks have been achieved based at least in part on the information/data regarding the work performed toward completing the task or sub-project and/or achieving one or more benchmarks regarding the task or sub-project and trigger one or more payments accordingly. In an example embodiment, a vendor (e.g., operating a user computing entity 30) may submit a payment request and information/data regarding the work performed toward completing the task or sub-project and/or achieving one or more benchmarks regarding the task or sub-project. Once a payment has been triggered (e.g., based at least in part on a payment request being received, a smart contract determining that one or more benchmarks have been achieved, and/or the like), the node computing entity 10 may confirm that payment is due to the vendor and cause a payment to be made to the vendor and committed to the distributed ledger of the distributed ledger platform/system 100.

FIG. 8 provides a flowchart illustrating processes, procedures, operations, and/or the like performed, for example, by a node computing entity 10, to provide payment to a vendor for work done toward completing a task of the project. Starting at step/operation 802, a task/sub-project update is received. For example, a node computing entity 10 may receive a task/sub-project update. For example, a user operating a user computing entity 30 may provide information/data corresponding to work performed toward completing a task or sub-project. The user may be a vendor, a project manager, and/or the like. In various embodiments, the information/data may include an accounting of work that has been performed, supplies that have been purchased, receipts for the purchase of supplies, who performed the work, when and/or where the work was performed, and/or the like. In an example embodiment, the information/data may include a payment request. The user computing entity 30 may receive the information/data corresponding to work performed toward completing a task or sub-project via user interaction with the IUI (e.g., via one or more user input interfaces) and then provide the information/data corresponding to the work performed toward completing the task or sub-project as a task/sub-project update. The user computing entity 30 may provide the task/sub-project update such that the node computing entity 10 receives the task/sub-project update. In an example embodiment, the task/sub-project update is committed to the distributed ledger, used to update one or more documents (e.g., stored in the data warehouse of the data warehouse entity 20, and/or the like) configured to track the completion of project and/or portions of the project.

At step/operation 804, it is determined if a benchmark has been achieved based at least in part on the task/sub-project update. For example, the node computing entity 10 may determine if a benchmark has been achieved based at least in part on the task/sub-project update. For example, a smart contract 424 may analyze the task/sub-project update and determine if a benchmark has been achieved. In an example embodiment, the benchmark may be completion of the task or sub-project. In an example embodiment, the benchmark may be a predetermined point in the completion of the task or sub-project (e.g., as defined in a contract between the vendor and the entity managing the project, for example).

When it is determined that the task/sub-project update does not indicate that a benchmark has been achieved, the node computing entity 10 may return to step/operation 802 and await the next task/sub-project update. When it is determined that the task/sub-project update does indicate that a benchmark has been achieved, the process continues to step/operation 806. At step/operation 806, a payment is triggered. For example, the smart contract 424 operating on the node computing entity 10 may trigger a payment to the vendor in an amount determined by the smart contract (e.g., based at least in part one terms defined in a contract between the vendor and the entity managing the project, for example).

At step/operation 808, the payment is completed and committed to the distributed ledger of the distributed ledger platform/system 100. For example, the node computing entity 10 (e.g., via the smart contract 424) may cause the payment to be made. For example, an amount determined by the smart contract 424 may be debited from an account corresponding to the entity managing the project and/or the project owner and credited to an account corresponding to the vendor. In an example embodiment, the information/data identifying the vendor account is stored in a vendor profile, is programmed into the smart contract 424, and/or the like. In an example embodiment, the node computing entity 10 may communicate with an automated clearing house (ACH) network (e.g., via network 40), and/or the like to cause the payment to be made. A payment transaction is recorded in the distributed ledger of the distributed ledger platform/system 100 to document the payment and/or to cause the payment to be made (e.g., the recording of the payment transaction may cause the payment amount to be debited from the project owner/manager account and credited to the vendor account).

At step/operation 810, a payment notification is provided. For example, a node computing entity 10 may generate and provide one or more payment notifications. For example, the payment notification may be provided such that one or more user computing entities 30 receive the payment notification. For example, the IUI provided via a user interface of a user computing entity 30 operated by and/or on behalf of the vendor or project manager/owner may be updated to indicate that a payment has been made to the vendor.

b. Some Other Exemplary Projects

In various embodiments, a distributed ledger platform/system 100 may be used to manage and/or track a project. In various embodiments, the project may be managing and/or operating a facility. In various embodiments, the project comprises a plurality of tasks, sub-tasks, projects, sub-projects, and/or the like, such as maintaining various aspects of the facility, performing repairs, tracking compliance with applicable standards (e.g., safety standards, manufacturing standards, and/or the like), and/or the like Various tasks, sub-tasks, projects, sub-projects, and/or the like may be performed by different vendors. In such an embodiment, a vendor may be contractor, sub-contractor, skilled tradesperson, organization employing or contracting skilled tradespeople and/or laborers, laborers, and/or the like that is hired (or is being considered for hiring) for performing one or more tasks, sub-tasks, projects, sub-projects, and/or the like of the project and/or an inspector (e.g., safety inspector). In order to perform a task or sub-project, a vendor may need access to one or more documents and/or portions of documents regarding the facility. For example, the vendor may need access to information/data regarding previous repairs or maintenance that has been performed, the original specifications for the facility and/or portion thereof or system thereof. In various embodiments, various documents corresponding to the facility, compliance with various standards (e.g., safety standards, manufacturing standards, and/or the like), previous repairs and/or maintenance performed, and/or the like are stored in a data warehouse by a data warehouse computing entity 20. Access to the documents stored in the data warehouse is provided and controlled via a distributed ledger of the distributed ledger platform/system 100. The distributed ledger platform/system 100 is configured to ensure that vendors accessing the documents are only able to access documents and/or portions of documents corresponding to the task or sub-project assigned to the vendor and that the vendor has appropriate credentials for accessing those documents and/or portions of documents. Thus, the platform may be configured to control access to the documents corresponding to the project by ensuring that vendors have appropriate credentials to perform the tasks, sub-tasks, projects, sub-projects, and/or the like assigned to the vendors and/or ensuring that vendors only have access to the documents and/or portions of documents needed to perform the tasks, sub-tasks, projects, sub-projects, and/or the like assigned to the vendors. In various embodiments, the distributed ledger platform/system 100 is configured to cause payment of vendors for performing the tasks, sub-tasks, projects, sub-projects, and/or the like assigned to the vendors and/or reaching benchmarks of the tasks, sub-tasks, projects, sub-projects, and/or the like assigned to the vendors, cause payment of inspection fees, and/or the like.

In an example embodiment, the distributed ledger platform/system 100 is configured to manage and/or track a project corresponding to the licensing of IP. For example, documents corresponding to the IP may be stored in a data warehouse of a data warehouse computing entity 20. The distributed ledger platform/system 100 may be configured to provide and control access to the documents and/or portions of documents stored in the data warehouse in accordance with the licenses, cause royalty and/or license payments to be made, and/or the like. Various embodiments of the distributed ledger platform/system 100 may be tailored for various other projects.

c. Technical Advantages

Various embodiments provide a variety of technical improvements. For instance, various embodiments provide a technical solution to the technical problem of managing, controlling access to, recording, and/or the like information/data corresponding to a project. For example, various embodiments ensure important documents corresponding to a project are available and that the most recent and/or up-to-date version of the documents are available for users needing access to the documents. Additionally, as users are only provided with documents and/or portions of documents that are required for that user to fulfill their role of the project (e.g., one or more tasks or projects), sensitive information/data in the documents may be maintained in an appropriate manner. Moreover, as payments are managed through the use of smart contracts, payments may be made in a timely manner at contracted benchmarks of tasks or projects and "facilitation payments" are prevented. Furthermore, the distributed ledger of the distributed ledger platform/system 100 provides an attested, verifiable history of the project and the documents stored in the data warehouse. Thus, various embodiments provide technical improvements to fields corresponding to distributed ledger systems, project management, and/or the like.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for controlling data access, the method comprising:
   providing, by a distributed ledger system, at least one vendor credentialed access to the distributed ledger system;
   receiving, by the distributed ledger system, a request to provide a vendor with access to sensitive information accessible via the distributed ledger system;
   responsive to receiving the request to provide the vendor with access to the sensitive information, determining, by the distributed ledger system, whether credentials of the vendor satisfy a stored variable, wherein the stored variable comprises a sensitivity category associated with the sensitive information;
   responsive to determining that the credentials of the vendor satisfy the stored variable, providing the vendor access to at least a portion of the sensitive information as a data transaction, and committing the data transaction with an identity of the vendor to a distributed ledger of the distributed ledger system; and
   responsive to determining that the credentials of the vendor do not satisfy the stored variable, not allowing the vendor access any portion of the sensitive information.

2. The method of claim 1, wherein a node of the distributed ledger system is in communication with a data warehouse storing one or more digital files each storing at least a portion of the sensitive information.

3. The method of claim 2, wherein the sensitive information comprises a document.

4. The method of claim 3, wherein a first portion of the document stored in the data warehouse is associated with a first sub-project and a first sensitivity class.

5. The method of claim 1, wherein (a) a node of the distributed ledger system is in communication with an oracle, and (b) the oracle is configured to provide information regarding the credentials of the vendor to the node.

6. The method of claim 1 further comprising determining a variable based at least in part on the information regarding the credentials of the vendor and storing the variable as the stored variable.

7. The method of claim 1, wherein a payment transaction is triggered by a smart contract executing on a node of the distributed ledger system.

8. A distributed ledger system comprising a non-transitory computer readable storage medium and one or more processors, the distributed ledger system configured to:
   provide at least one vendor credentialed access to the distributed ledger system;
   receive a request to provide a vendor with access to sensitive information accessible via the distributed ledger system;
   responsive to receiving the request to provide the vendor with access to sensitive information, determine whether credentials of the vendor satisfy a stored variable, wherein the stored variable comprises a sensitivity category associated with the sensitive information;
   responsive to determining that the credentials of the vendor satisfy the stored variable, provide the vendor access to at least a portion of the sensitive information as a data transaction, and committing the data transaction with an identity of the vendor to a distributed ledger of the distributed ledger system; and
   responsive to determining that the credentials of the vendor do not satisfy the stored variable, not allow the vendor access any portion of the sensitive information.

9. The distributed ledger system of claim 8, wherein a node of the distributed ledger system is in communication with a data warehouse storing one or more digital files each storing at least a portion of the sensitive information.

10. The distributed ledger system of claim 9, wherein the sensitive information comprises a document.

11. The distributed ledger system of claim 10, wherein a first portion of the document stored in the data warehouse is associated with a first sub-project and a first sensitivity class.

12. The distributed ledger system of claim 8, wherein (a) a node of the distributed ledger system is in communication with an oracle, and (b) the oracle is configured to provide information regarding the credentials of the vendor to the node.

13. The distributed ledger system of claim 8, wherein the distributed ledger system is further configured to determine a variable based at least in part on the information regarding the credentials of the vendor and storing the variable as the stored variable.

14. The distributed ledger system of claim 8, wherein a payment transaction is triggered by a smart contract executing on a node of the distributed ledger system.

15. A computer program product comprising a non-transitory computer readable medium having computer program instructions stored therein, the computer program instructions when executed by a processor, cause the processor to:
provide at least one vendor credentialed access to the distributed ledger system;
receive a request to provide a vendor with access to sensitive information accessible via the distributed ledger system;
responsive to receiving the request to provide the vendor with access to sensitive information, determine whether credentials of the vendor satisfy a stored variable, wherein the stored variable comprises a sensitivity category associated with the sensitive information;
responsive to determining that the credentials of the vendor satisfy the stored variable, provide the vendor access to at least a portion of the sensitive information as a data transaction, and committing the data transaction with an identity of the vendor to a distributed ledger of the distributed ledger system; and
responsive to determining that the credentials of the vendor do not satisfy the stored variable, not allow the vendor access any portion of the sensitive information.

16. The computer program product of claim 15, wherein a node of the distributed ledger system is in communication with a data warehouse storing one or more digital files each storing at least a portion of the sensitive information.

17. The computer program product of claim 16, wherein the sensitive information comprises a document.

18. The computer program product of claim 17, wherein a first portion of the document stored in the data warehouse is associated with a first sub-project and a first sensitivity class.

19. The computer program product of claim 15, wherein a payment transaction is triggered by a smart contract executing on a node of the distributed ledger system.

20. The method of claim 1, wherein determining, by the distributed ledger system, whether the credentials of the vendor satisfy the stored variable comprises determining, via a consensus mechanism within the distributed ledger system, whether the credentials of the vendor satisfy the stored variable.

21. The method of claim 20, wherein the consensus mechanism comprises voting functions among nodes of the distributed ledger.

* * * * *

UNITED STATES PATENT AND TRADEMARK OFFICE
CERTIFICATE OF CORRECTION

| | | |
|---|---|---|
| PATENT NO. | : 12,105,819 B2 | Page 1 of 1 |
| APPLICATION NO. | : 17/250584 | |
| DATED | : October 1, 2024 | |
| INVENTOR(S) | : Mackenzie et al. | |

It is certified that error appears in the above-identified patent and that said Letters Patent is hereby corrected as shown below:

On the Title Page

Item (73) Assignee, Please change "KOCH CAPABILITES, LLC., Wichita, KS (US)" to --KOCH CAPABLITIES, LLC, Wichita, KS (US)--.

Signed and Sealed this
Sixth Day of May, 2025

Coke Morgan Stewart
*Acting Director of the United States Patent and Trademark Office*